(12) United States Patent
Mekhtiche et al.

(10) Patent No.: US 11,910,751 B1
(45) Date of Patent: Feb. 27, 2024

(54) ROBOTIC SYSTEM FOR HARVESTING AND MAINTAINING DATE PALMS

(71) Applicant: KING SAUD UNIVERSITY, Riyadh (SA)

(72) Inventors: Mohamed Amine Mekhtiche, Riyadh (SA); Mansour Mohammed A. Alsulaiman, Riyadh (SA); Yousef Ahmed M. Alohali, Riyadh (SA); Mohamed Abdelkader Bencherif, Riyadh (SA); Ghulam Muhammad, Riyadh (SA); Abdul Wadood, Riyadh (SA); Mohammed Faisal Abdulqader Naji, Riyadh (SA); Hassan Ismail H. Mathkour, Riyadh (SA); Mohammed Mahdi Algabri, Riyadh (SA); Hebah Abdulaziz Elgibreen, Riyadh (SA); Hamid Abdulsalam Ghaleb, Riyadh (SA); Hamdi Taher Altaheri, Riyadh (SA); Taha Mohammed Ahmed Alfaqih, Riyadh (SA); Muneer Hamid Ahmed Al-Hammadi, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 18/123,242

(22) Filed: Mar. 17, 2023

(51) Int. Cl.
*A01D 46/30* (2006.01)
*A01D 46/20* (2006.01)

(52) U.S. Cl.
CPC ............ *A01D 46/30* (2013.01); *A01D 46/20* (2013.01)

(58) Field of Classification Search
CPC ......... A01D 46/00–46/30; A01D 45/00–45/30
See application file for complete search history.

(56) References Cited

U.S. PATENT DOCUMENTS

| 4,074,819 A | 2/1978 | Labourre |
| 5,301,459 A | 4/1994 | Eliachar et al. |

(Continued)

FOREIGN PATENT DOCUMENTS

| CN | 107258237 A | * | 10/2017 |
| CN | 107810715 A | * | 3/2018 |

(Continued)

OTHER PUBLICATIONS

Fruit Picking Robots, Into Robotics Copyright © 2013-2020, Aug. 21, 2017, website: https://www.intorobotics.com/fruit-harvesting-robots/.

*Primary Examiner* — Adam J Behrens
*Assistant Examiner* — Madeline I Runco
(74) *Attorney, Agent, or Firm* — Nath, Goldberg & Meyer; Richard C. Litman

(57) ABSTRACT

The robotic system for harvesting, and performing pre- and post-harvesting tasks of date palm trees includes three main parts: a truck platform, a scissor lift, and a multi-task system. The truck platform provides mobility for the whole system, while the scissor lift raises the multi-task system to the top of the palm tree. The multi-task system is fixed on top of the scissor lift and includes a large basin that catches fruits during harvesting. A circular track is fixed within the basin and includes a 2-degree-of-freedom (DOF) slider base mounted thereon. On top of the 2-DOF slider base is a robotic arm fitted with the proper tool (harvesting tool, maintenance tool or bagging system) for the task to be performed. The circular track has pivoting sections, and the basin has a flexible portion in the rear of the truck platform to allow the system to surround the palm tree.

17 Claims, 32 Drawing Sheets

(56) References Cited

U.S. PATENT DOCUMENTS

| | | | |
|---|---|---|---|
| 5,428,947 A | | 7/1995 | Visser |
| 5,438,793 A | | 8/1995 | Eliachar et al. |
| 10,485,171 B1 | * | 11/2019 | Mekhtiche ............. A01D 46/22 |
| 11,491,645 B2 | * | 11/2022 | Asada ...................... B25J 9/126 |
| 2005/0091957 A1 | | 5/2005 | Stanners et al. |

FOREIGN PATENT DOCUMENTS

| | | | | |
|---|---|---|---|---|
| CN | 107852961 A | * | 3/2018 | |
| CN | 109463129 A | * | 3/2019 | |
| CN | 111713252 A | * | 9/2020 | |
| CN | 111742709 A | * | 10/2020 | |
| CN | 112060107 A | * | 12/2020 | |
| DE | 2200025 A | | 7/1973 | |
| EP | 0580248 A1 | | 1/1994 | |
| FR | 2730127 A1 | | 8/1996 | |
| GB | 2123382 A | | 2/1984 | |
| GB | 2128864 A | | 5/1984 | |
| GB | 2541868 A | | 3/2017 | |
| JP | 2015226485 A | | 12/2015 | |
| JP | 2016086696 A | | 5/2016 | |
| KR | 102073180 B1 | * | 2/2020 | |

* cited by examiner

ROBOTIC SYSTEM FOR HARVESTING AND MAINTAINING DATE PALMS

BACKGROUND

1. Field

The disclosure of the present patent application relates to robotics for plant husbandry, and particularly to a robotic system for harvesting and maintaining date palms.

2. Description of the Related Art

Traditionally, there are several steps involved in harvesting the fruit from tall trees, such as date palm trees. For short, young palms, a sharp flat blade attached to the end of a steel water pipe is commonly used to cut the fruit. To cut a fresh fruit bunch, a cutter (person using the blade) accelerates the blade into the fresh fruit bunch stalk with an underhanded upward motion. The weight of the water pipe provides enough inertia and stored energy to sever the stalk. For older, taller palms, a sharp blade attached to the end of a long pole is used. The cutter carries the pole upright. It is physically taxing to raise and lower the pole because of its length. When the cutter identifies a ripe fruit, he maneuvers the blade around the top of the fresh fruit bunch stalk and cuts it with a vigorous downward pull on the pole. The fruit falls to the ground, and depending on the height, a number of fruitlets will separate from the fresh fruit bunch upon impact. Loose fruit is, by weight, the most valuable part of the harvest.

Once the fruit is cut, the next step of harvesting involves the in-field collection, which is achieved by a second laborer, who manually collects and carries the fresh fruit bunch to a haul road in a sling or on his or her shoulder. The fruit is then carried to the haul road and left at a fresh fruit bunch pile. The final stage of harvesting involves moving the fruit from the haul road by a tractor pulling a trailer, along with several laborers who travel down the roads stopping to pick up fruit at row ends, spearing the fruit with spikes and throwing them over the side of the wagon. When the wagon is full, the tractor pulls it to a chute area where the fruit is dumped, much like the action of a dump truck. Trucks from the mill back under a chute and a tractor equipped with a front-end loader pushes fruit down the chute onto the truck. This process is inherently inefficient, since the fruit is handled three times, often causing damage to the fruit each time. Further, the rate of collection is not well matched to the rate of cutting. The tall palm cutter is slow, so the collector's work rate is also slow, and he is underutilized, whereas the short palm collector is typically overworked.

There are presently several options to modernize the collection of palm fruit. A mechanical buffalo, which is a simple three-wheel carrier with a dump bin, has been used in the collection of the fruit once it has been cut, as described above. To collect fruit, one or two laborers travel down the rows after the fruit is cut, using spikes to spear fresh fruit bunches and load the fruit into the mechanical buffalo's dump bin. When full, the load is dumped at the haul road, and the rest of the evacuation process to the mill is as described above. If loose fruit is collected, it is a separate operation, since the fresh fruit bunch collection process is too fast for loose fruit collection. This process has proven to be more efficient than hand carrying by reducing the direct labor content and substituting capital.

Another option for collecting fruit is the use of a mini-tractor/grabber, which is a mini-tractor equipped with a hydraulic grabber, towing a scissor lift trailer. The operator drives down the palm rows using the grapple to pick up fruit in front of him, and deposits it in the trailer behind him. As with the mechanical buffalo, a separate operation is required to retrieve the loose fruit. When the trailer is full, it is driven to a large over-the-road trailer that is placed in the field at a convenient location.

Articulating boom lifts have also been used, but they cannot be operated quickly, nor can they travel over the ground quickly with an operator in them. They are constructed as, essentially, a mass at the end of a cantilevered beam and would result in unacceptable jostling of the cutter when moving between trees. Telescoping boom lifts are equally ineffective, since they are prohibitively heavy and slow to operate. In addition, they cannot access the back side of a palm, thus requiring them to be maneuvered on the ground to a place where the fruit is accessible.

As outlined above, harvesting date palm trees is an exhausting, labor-intensive, and dangerous task. In addition, there are many pre-harvesting and post-harvesting tasks, which are exhausting and dangerous as well. These tasks are essential for tree maintenance and better yield. Unfortunately, farmers are also suffering from a lack of skilled labor. So they are forced to either sell their farms at a low price or even abandon it.

In the inventors' previous patent, U.S. Pat. No. 10,485,171, issued Nov. 26, 2019, which is hereby incorporated by reference in its entirety, a tree harvesting tool is presented. The tree harvesting tool solves many of the aforementioned problems, using a circular track that is positioned around the date palm. A movable platform is mounted on the circular track and can be selectively driven to a required position. A robotic arm or bagging apparatus may be mounted on the platform for performing a number of harvesting, pre-harvesting, and post-harvesting tasks. The tree harvesting tool, however, among other drawbacks, is also supported by a conventional lifter, which is off-center, making it very unstable and a potential risk for accidents, in addition to limiting the harvesting payload of the tool.

Thus, a robotic system for harvesting and maintaining date palms solving the aforementioned problems is desired.

SUMMARY

The robotic system for harvesting and maintaining date palms is a complete stand-alone system for harvesting and maintaining date palms. The system includes a multi-task platform for performing harvesting, pre-harvesting, and post harvesting tasks on date palms; a scissor lift system; and a truck platform. The multi-task platform includes a large rectangular basin with a slot from its rear edge to circular hole in its center. The slot and the circular hole allow the basin to allow the passage of, and to surround, a date palm tree trunk and collect the fruits during the harvesting task. A circular track is fixed in the basin and includes a fixed section and two rotatable sections mounted on hinges that can be opened to allow the passage of the date palm tree trunk, or closed to encircle the date palm tree trunk in the center of the circular track. A two degree of freedom (2-DOF) slider base is mounted on the circular track and includes a slider base tool platform or upper surface. A first electric motor propels the slider base around the track, while a second electric motor extends the tool platform inward or retracts the tool platform outward perpendicular to the circular track. The 2-DOF slider base is adjustable to operate on palm trees of any size. A robotic arm with the required tool or a bagging system is fixed to the tool platform.

The scissor lift system supports the multi-task platform and includes: a scissor lift subsystem to lift the multi-task system to the top of the palm tree; and an inclining subsystem to incline the multi-task platform (and basin) backward in order to discharge the harvested fruits out of the basin.

The truck platform supports the scissor lift system and the multi-task platform on its tail end (opposite to the operator cabin of the truck platform). The tail end includes a slot from its rear edge to its center to allow the passage of the date palm tree trunk. Independent rear axles are used to support the rear wheels. The robotic system for harvesting and maintaining date palms is very stable, as the truck platform, the scissor lift system and the multi-task platform have centers of gravity that are substantially aligned vertically (when the multi-task platform is not inclined).

The robotic system for harvesting and maintaining date palms can perform many tasks of tree maintenance and harvesting. The system will enable farmers to easily harvest the palm trees and accomplish all the required maintenance tasks without the need of manually climbing the palm tree. It only requires a single operator to drive the system into position and then use a teleoperated system to accomplish all the required harvesting and maintenance tasks. The system is standalone in that it does not need additional support devices like power sources, independent lifting machines, or transportation to and from the palm tree location. The system is also very stable as the multi-task platform is lifted and maintained above the center of gravity of the system. This allows a larger payload to be collected in the basin, so more quantities of harvested fruits can be collected before the need to discharge the fruits, thereby reducing the time needed for harvesting. The included advanced cameras can provide images for analysis to detect stress and illnesses of the trees using pattern recognition tools.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
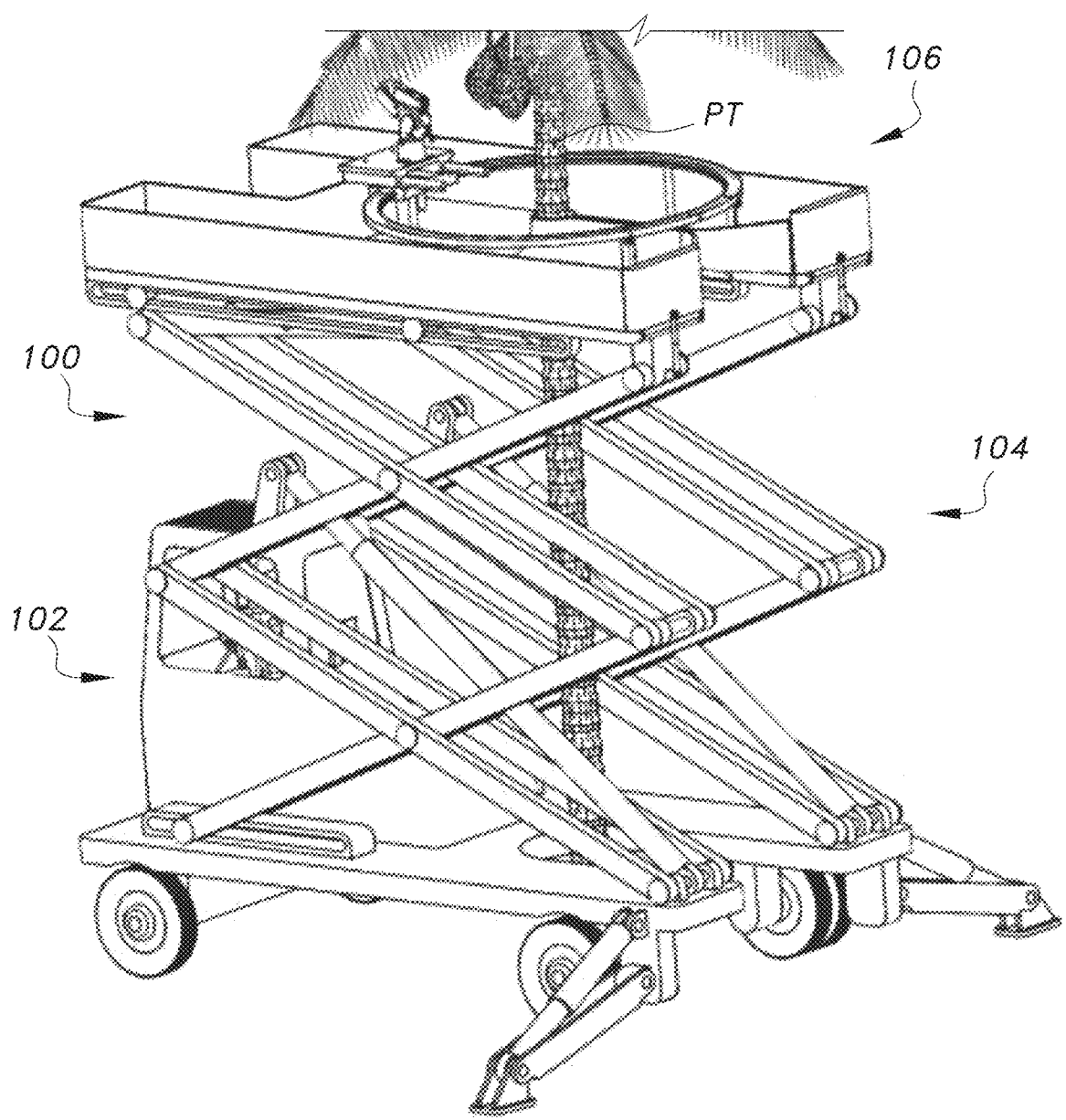
FIG. 1 is an environmental, perspective view of a robotic system for harvesting and maintaining date palms.

Referring to FIGS. 1 and 3A-3C, the robotic system for harvesting and maintaining date palms 100 includes three subsystems, including a truck platform 102; a scissor lift system 104; and a multi-task platform 106 for harvesting, pre-harvesting, and post-harvesting tasks. The truck platform 102 provides transportation and positioning of the system 100. As best seen in FIG. 1, the scissor lift and inclining system 104 lifts the multi-task platform 106 in proximity to the top of a palm tree PT to perform the necessary operations. In addition, the scissor lift system 104 is also used to incline the multi-task platform 106 when discharging fruits, as described in detail below with respect to FIGS. 7 and 22M. The robotic system for harvesting and maintaining date palms 100 is very stable, as the truck platform 102, the scissor lift system 104 and the multi-task platform 106 have centers of gravity that are substantially aligned vertically (when the multi-task platform is not inclined).

Figure 4:
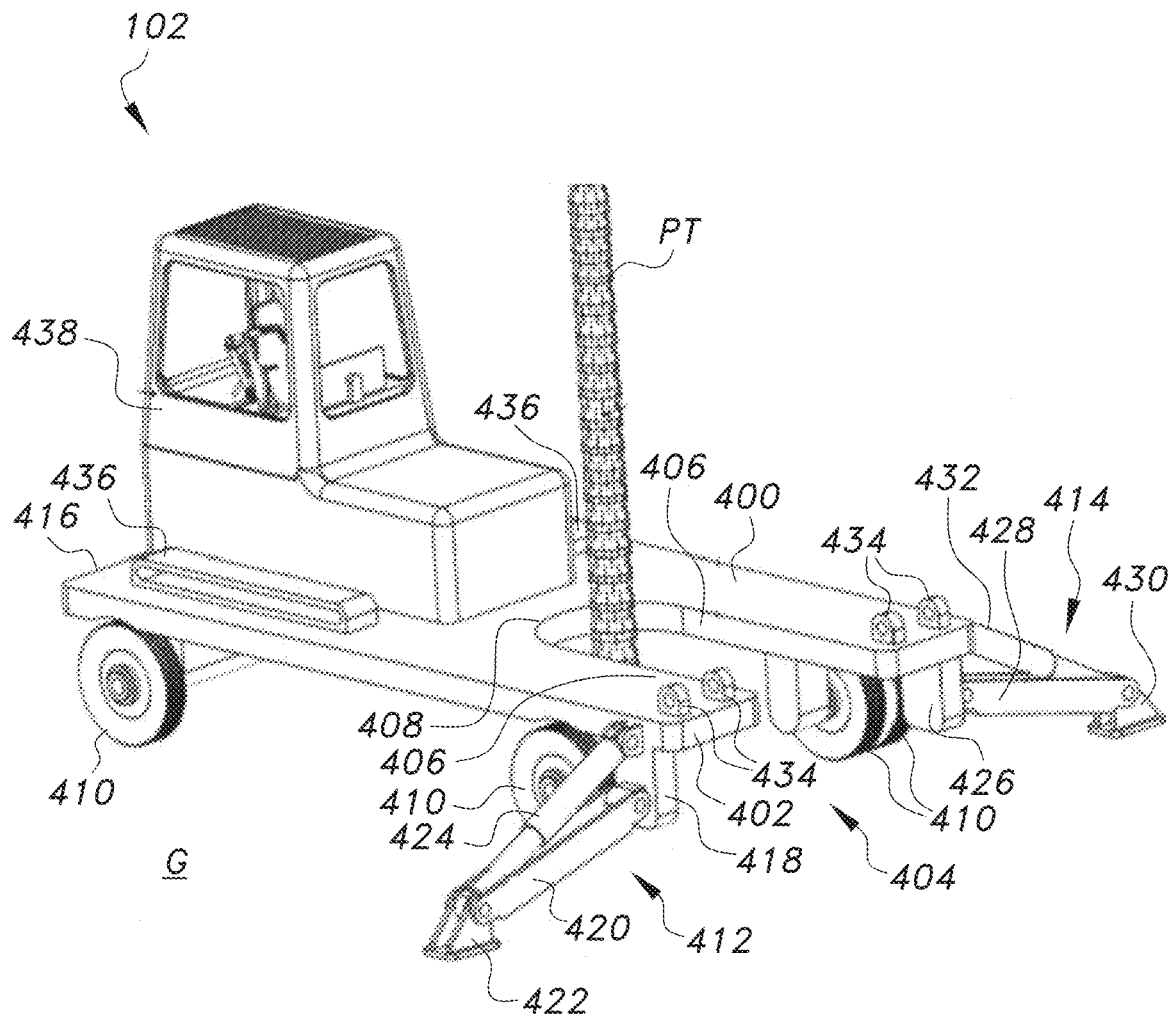
FIG. 4 is an environmental, perspective view of the vehicle platform of FIG. 3A.
Figure 5:
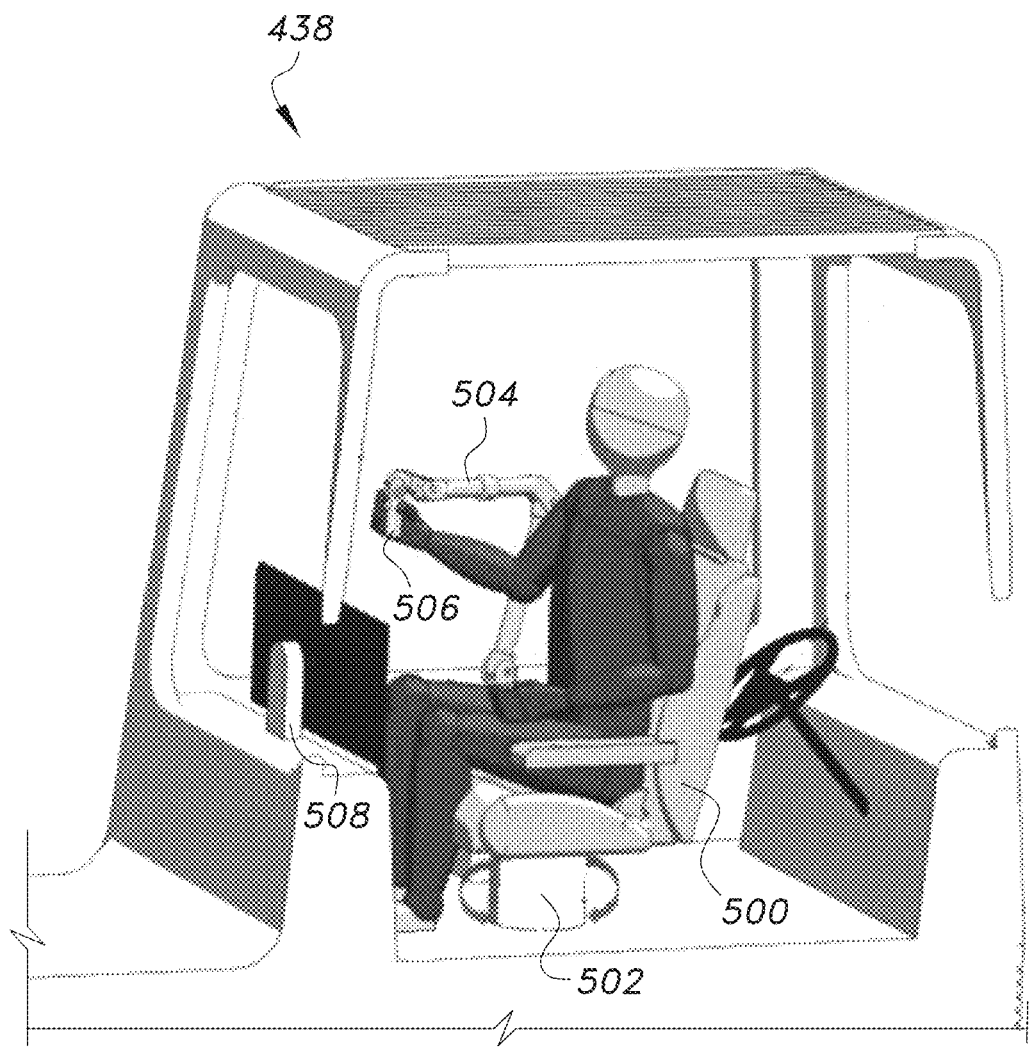
FIG. 5 is an environmental, perspective view of an operator cabin of the robotic system for harvesting and maintaining date palms of FIG. 1.

The details of the truck platform 102 are shown in FIGS. 4-5. The truck platform 102 includes a flatbed portion or chassis 400 for supporting the scissor lift and inclining system 104 on an upper surface thereof. The tail end of the truck platform 102 has a slot 404 extending from its rear edge 402 to its center. The slot 404 includes two longitudinal sections 406 and a semicircular section 408, which allows the palm tree PT trunk to be surrounded by the tail end of the truck platform 102, as shown in FIG. 4, and by the system 100, as shown in FIG. 1. The truck platform 102 is supported by wheels and tires 410 mounted on axles, as is known in the vehicle art. The rear wheels may be dual wheels, as shown, to provide additional support. The rear wheels are also mounted on independent axles, (not shown) to provide for the passage of the palm tree PT trunk. The tail end of the truck platform 102 also includes two stabilizers 412, 414 mounted thereon, to provide lateral stabilization for the system 100. It should be understood that two more stabilizers may also be mounted on the front end 416 of the truck platform 102, as needed. The left stabilizer 412 includes: a left downward extending support plate 418; a left stabilizer link 420 rotatably attached at its proximate end to the support plate 418; a left ground-engaging pad 422 rotatably attached to a distal end of the left stabilizer link 420; and a left stabilizer hydraulic cylinder 424 extending between the support plate 418 and the distal end of the left stabilizer link 420, to thereby selectively lift and lower the left ground-engaging pad 422, into and out of engagement with the ground G about the palm tree PT. Similarly, the right stabilizer 414 includes a right downward extending support plate 426; a right stabilizer link 428 rotatably attached at its proximate end to the support plate 426; a right ground-engaging pad 430 rotatably attached to a distal end of the right stabilizer link 428; and a right stabilizer hydraulic cylinder 432 extending between the support plate 426 and the distal end of the right stabilizer link 428 to thereby selectively lift and lower the left ground engaging pad 430 into and out of engagement with the ground G about the palm tree PT The upper surface of the flatbed chassis 400 includes left and right rear scissor lift bearing supports 434 near the tail end of the truck platform 102 for housing lower bearings of the scissor lift system 104, and left and right front scissor lift sliding bearing housings 436 near the front end of the truck platform 102 for the receipt of lower sliding bearings, as described further below with respect to FIG. 6. A driver/operator cabin 438 is also mounted on the upper surface of the flatbed chassis 400 near the front end of the truck platform 102.

The details of the driver/operator cabin 438 are shown in FIG. 5. The driver/operator cabin 438 includes conventional features, such as a roof, walls, windows, at least one door, a steering wheel and other vehicle control mechanisms, some of which (but not all) are shown in FIG. 5. In addition to the features listed above, the driver/operator cabin 438 includes a seat 500 mounted on a rotatable base 502, so that the operator can switch between a driving position facing the front of the truck platform 102, or an operator position facing the tail end of the truck platform 102. In the driving position, the driver/operator drives the system 100 from one palm to another, as described further below with respect to FIGS. 21-22M. In the operating position, the driver/operator controls the scissor lift, the inclining system 104, and the multi-task platform 106 to perform the harvesting, pre-harvesting and post-harvesting tasks. The driver/operator cabin 438 also includes an adjustable arm 504 for supporting a hand-operated controller 506 to provide input to a control system for controlling components on the multi-task platform 106, as described further below. The surface of the hand-operated controller 506 includes buttons and potentiometers for providing the desired inputs. A special glove (not shown) equipped with sensors can alternatively replace the hand-operated controller 506. The hand-operated controller 506 can also be replaced by using a 3-D joystick (not shown). The cabin also contains a touch screen 508 mounted opposite to the steering wheel that can be used to display the status of the system 100 and streaming views from cameras on the multi-task platform 106. The touch screen 508 is also used to control some parts of the multi-task platform 106 and the scissor lift system 104, as described further below.

Figure 2:
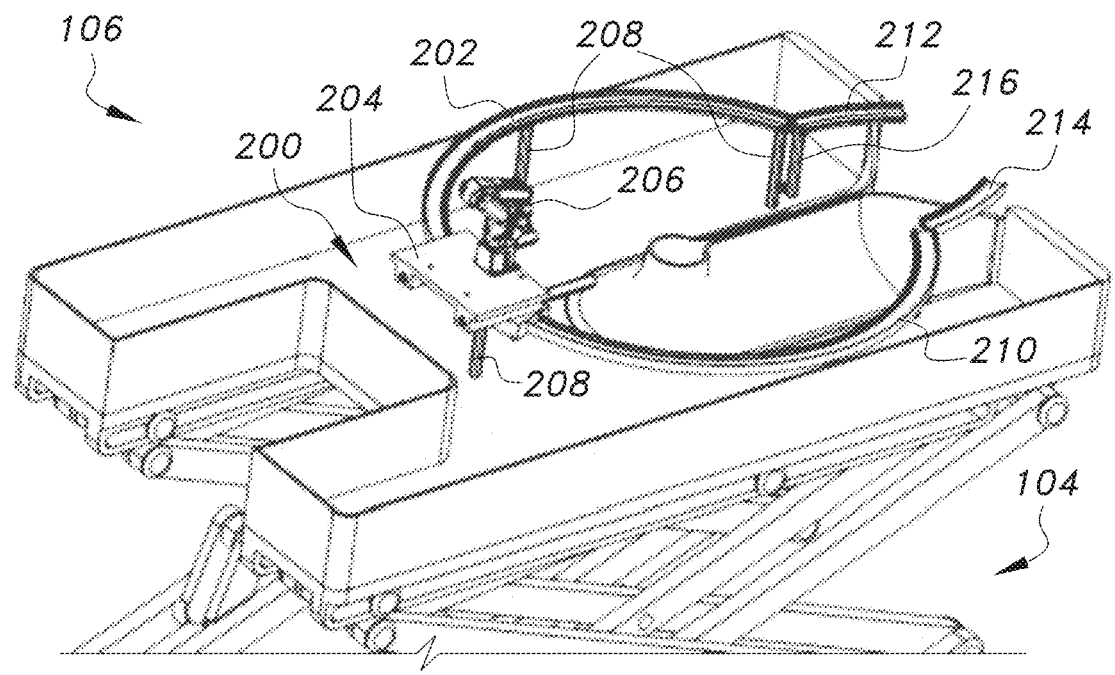
FIG. 2 is a perspective front view of a multi-task platform of the robotic system for harvesting and maintaining date palms of FIG. 1.
Figure 3C:
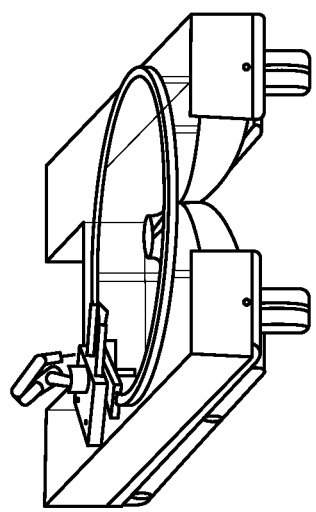
FIG. 3C is a perspective rear view of the multi-task platform of FIG. 2.
Figure 3B:
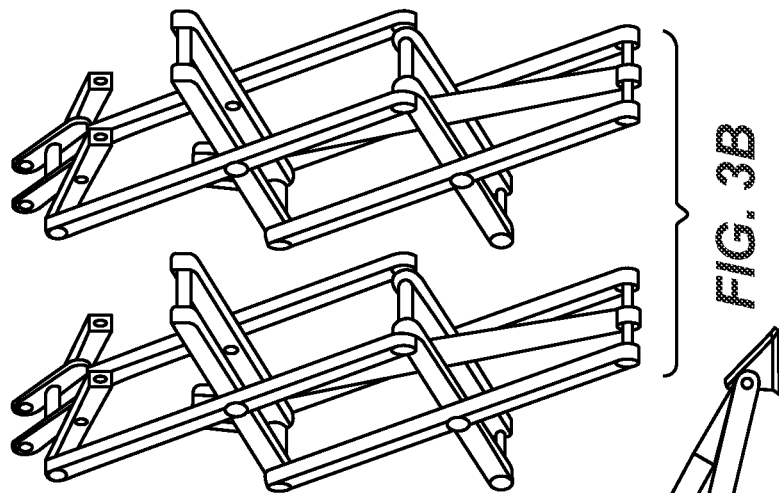
FIG. 3B is a perspective view of a scissor lift and tilt mechanism of the robotic system for harvesting and maintaining date palms of FIG. 1.
Figure 3A:
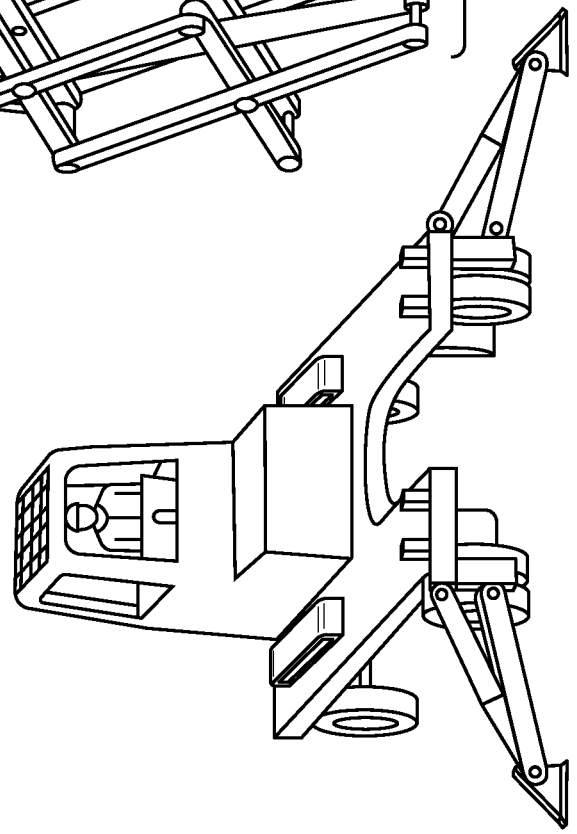
FIG. 3A is a perspective view of a vehicle platform of the robotic system for harvesting and maintaining date palms of FIG. 1.
Figure 7:
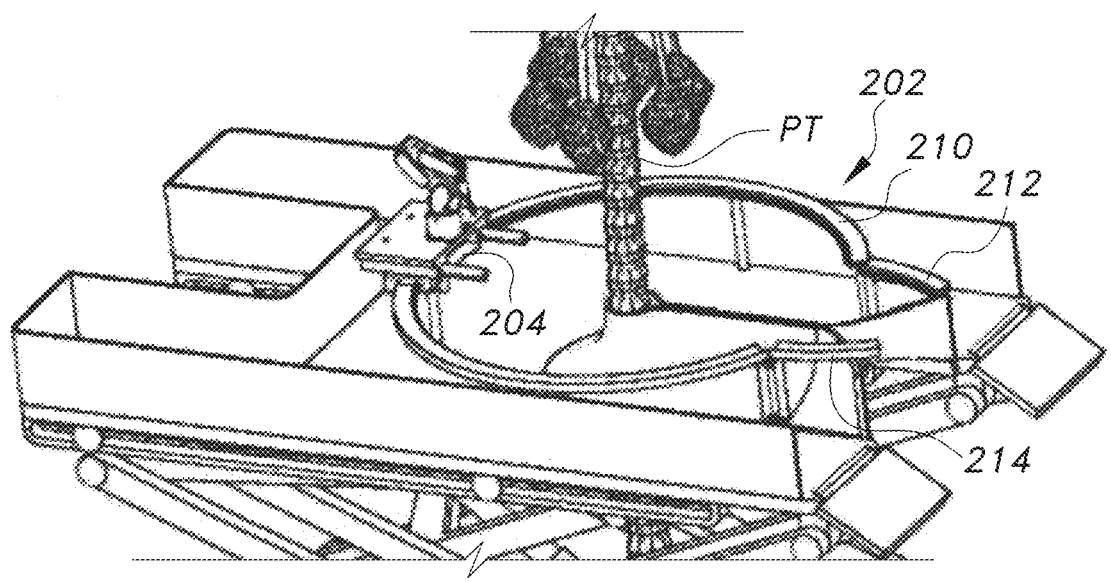
FIG. 7 is an environmental, perspective view of the multi-task platform of FIG. 2, showing the platform in an unloading configuration.
Figure 18:
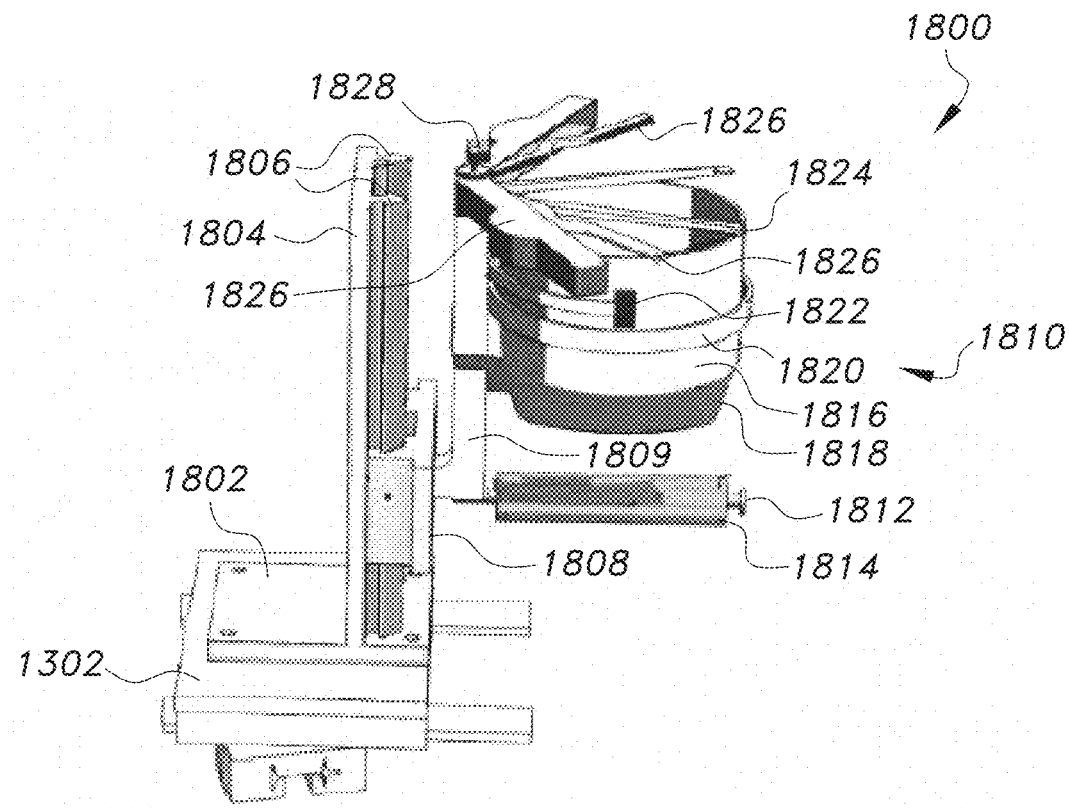
FIG. 18 is a perspective side view of a bagging system mounted on the two degree of freedom slider of FIG. 10.

The details of the multi-task platform 106 are best seen in FIGS. 2 and 7-9. The multi-task platform 106 is fixed on top of the scissor lift system 104. The multi-task platform 106 includes four components, including a basin 200; a circular track 202; a 2-DOF slider base 204; and a palm handling system 206, which may be a robotic arm as shown in FIGS. 2 and 7, or a bagging system as shown in FIG. 18.

Figure 8:
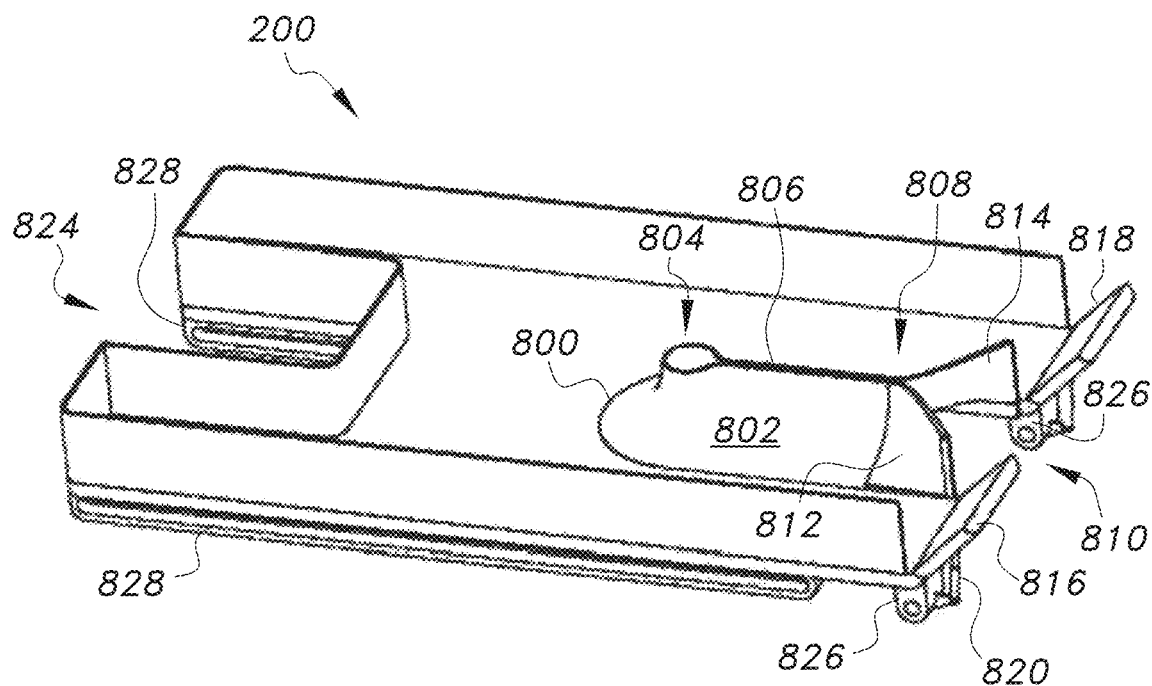
FIG. 8 is a perspective view of the multi-task platform of FIG. 2, with upper portions of the platform removed to show details of an underlying basin.

The details of the basin 200 are best seen in FIG. 8. The basin 200 is used to catch fruit during the harvesting task. There is a slot 800 in the basin 200 to allow the passage of the trunk of a date palm tree, similar to the slot 404 in the tail end of the truck platform 102. The slot 800 includes two longitudinal sections and a semicircular section. An insert 802 fills the slot 800 and is made of a flexible material, such as rubber. The insert 802 includes a circular hole 804 and a slit 806 that extends longitudinally from the hole 804 to a point 808 near the tail 810 of the basin 200, where the opposite sides of the insert 802 diverge into two walls 812, 814 that form a flared out section. The sides of the insert 802 are sloped outward to direct any falling fruit into the basin 200. The slit 806 and the flexible material of the insert 802 allow the driver to position the basin such that the palm tree trunk enters the slit 806 and eventually into the hole 804, allowing the slit 806 to reclose. The tail end 810 of the basin 200 also includes two rear discharge doors 816, 818. The doors 816, 818 are opened (lowered) and closed (raised) using hydraulic jacks 820, 822. The doors 816, 818 are opened to discharge the harvested fruits, as described in detail below. The front of the basin 200 includes a cut-out section 824 for receipt of the driver/operator cabin 438. While the cut-out section 824 is shown as generally rectangular, it should be understood that the shape would be selected to closely match the shape of the driver/operator cabin 438 to maximize the payload of the basin 200. The bottom of the basin 200 includes left and right rear scissor lift bearing supports 826 near the tail end 810 of the basin 200 for housing upper bearings of the scissor lift system 104, and left and right front scissor lift sliding bearing housings 828 near the front end of the basin 200 for the receipt of upper sliding bearings, as described further below with respect to FIG. 6.

Figure 9:
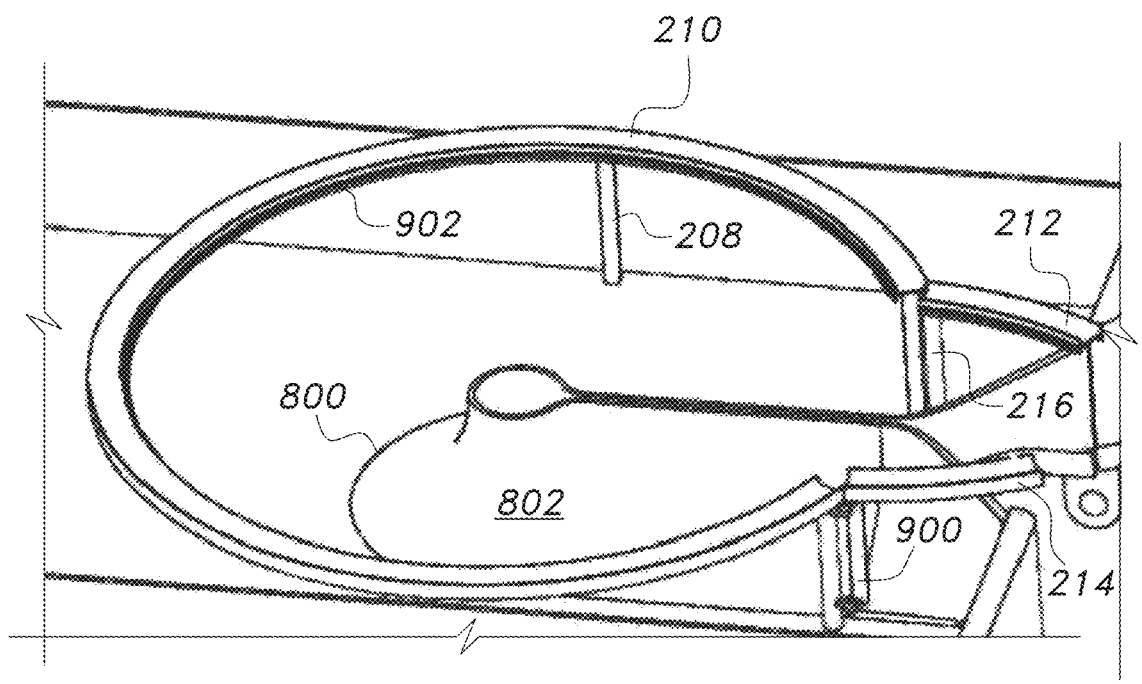
FIG. 9 is a perspective view of the multi-task platform of FIG. 2, with portions of the platform removed to show details of a circular track.

In the basin, a circular track 202 is fixed. The details of the circular track 202 are best seen in FIGS. 2, 7, and 9. The 2-DOF slider base 204 is mounted on the circular track 202. The circular track 202 is supported on the basin 200 floor by a plurality of posts 208 and includes three sections, including a first fixed section 210 in the form of an arc of approximately 280-320°; and second 212 and third 214 sections that are mounted on posts 216 and 900, respectively. The posts 216 and 900 are pivotally connected to adjacent fixed posts 208 to allow the second 212 and third 214 sections to be rotated between opened and closed positions. The second 212 and third 214 sections are shown in their open position in FIGS. 2, 7, and 9, and shown in their closed position in FIG. 3C. When the sections 212, 214 are in their open positions, the system 100 can be positioned about the palm tree PT, as shown in FIG. 7. Once the system 100 is in position, the sections 212, 214 can be closed to provide a continuous circular track surrounding the palm tree PT trunk. The track 202 includes a spur gear 902 on its inner side for engagement by a driven gear on the 2-DOF slider base 204, as described below.

Figure 10:
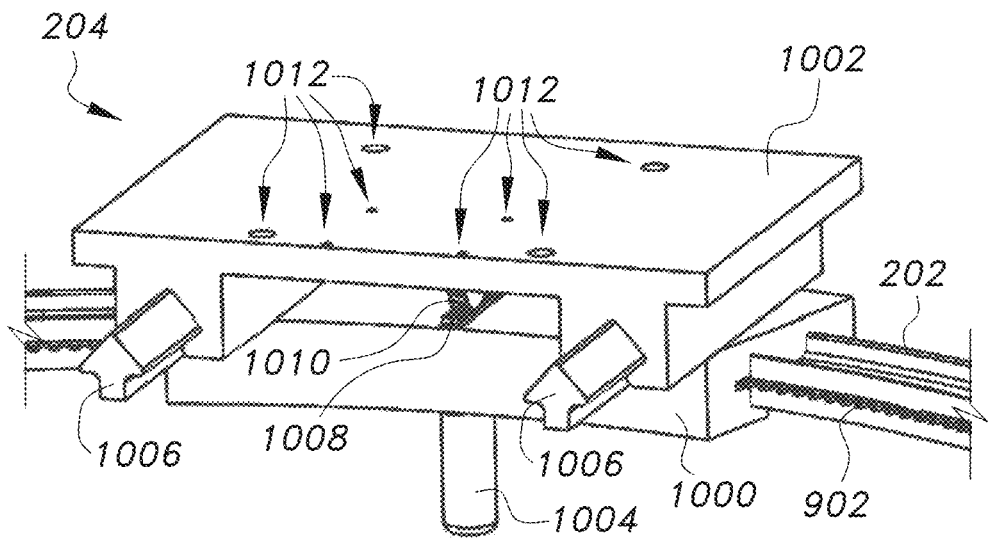
FIG. 10 is a fragmented, inner perspective view of a two degree of freedom slider base mounted on the circular track of FIG. 9.
Figure 11:
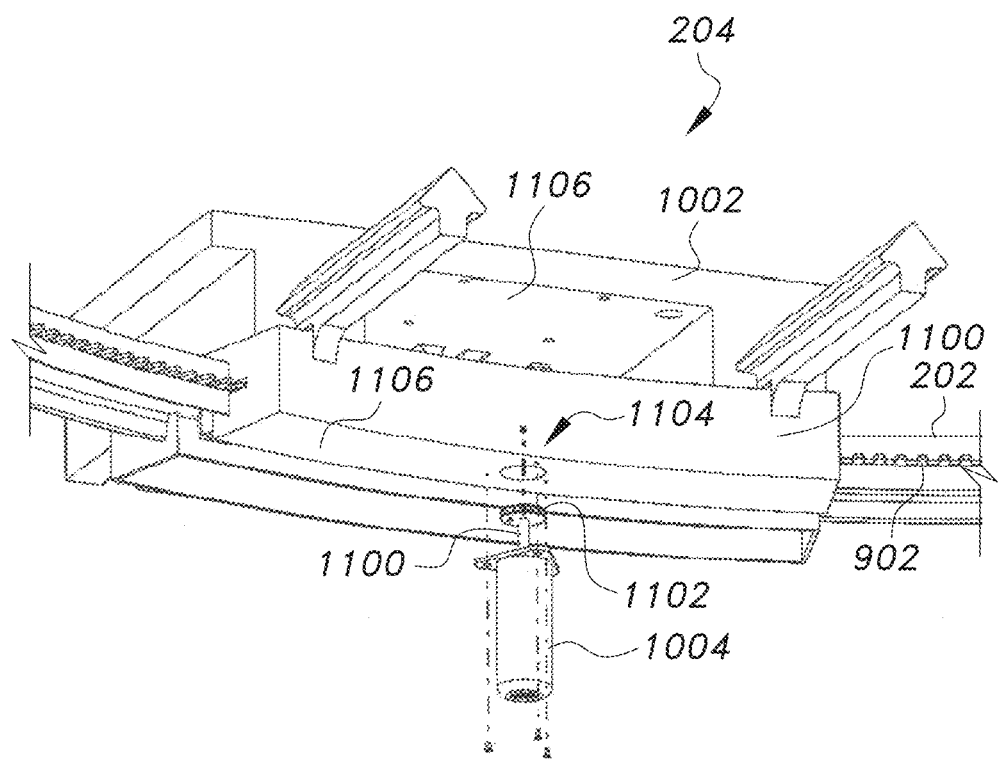
FIG. 11 is a fragmented, inner perspective, partially exploded view of the two degree of freedom slider of FIG. 10.
Figure 12:
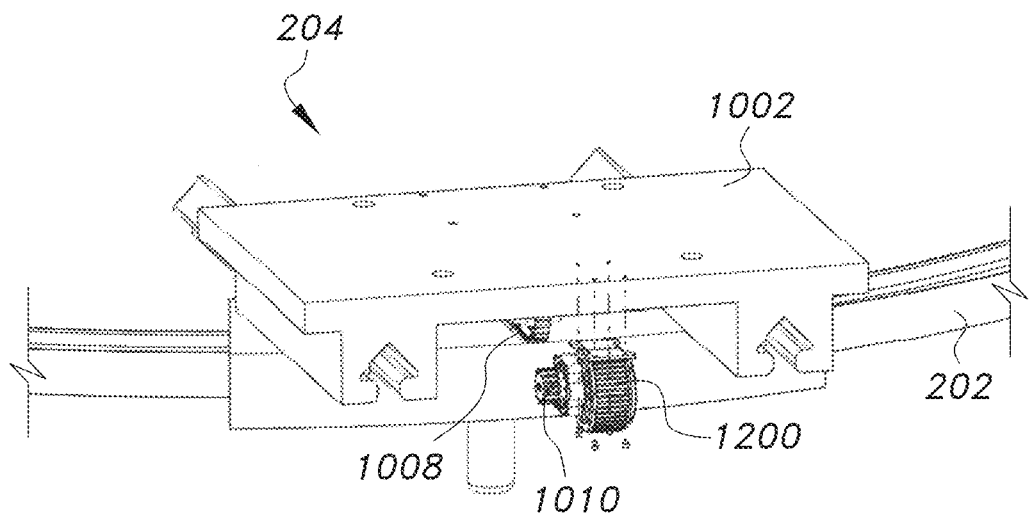
FIG. 12 is a fragmented, outer perspective, partially exploded view of the two degree of freedom slider of FIG. 10.

The details of the 2-DOF slider base 204 are best seen in FIGS. 10-12. The 2-DOF slider base consists of two main parts, a track-engaging base 1000 and a tool platform 1002. The track-engaging base 1000 is mounted on the circular track 202 and is moved around the circular track 202 by a first electric motor 1004 mounted on the bottom 1006 of the track-engaging base 1000. The first motor 1004 includes a drive shaft 1100 with a track-engaging gear 1102 mounted thereon that engages the spur gear 902 on the circular track 202. The drive shaft 1100 extends through a hole 1104 in the bottom 1006 of the track-engaging base 1000, as best seen in the exploded view of FIG. 11. The tool platform 1002 is mounted on the top of the track-engaging base 1000 on two rails 1006 that provide support when the tool platform 1002 is positioned inward of the circular track 202. A spur gear 1008 on the top of the track-engaging base 1000 is engaged by a lateral movement gear 1010 that is driven by a second electric motor 1200 attached to the bottom surface 1106 of the tool platform 1002 to move the tool platform 1002 perpendicular to the circular track 202. The tool platform 1002 includes a plurality of holes 1012 for fixing a robotic arm or a bagging system to the tool platform 1002, as described below.

Figure 13:
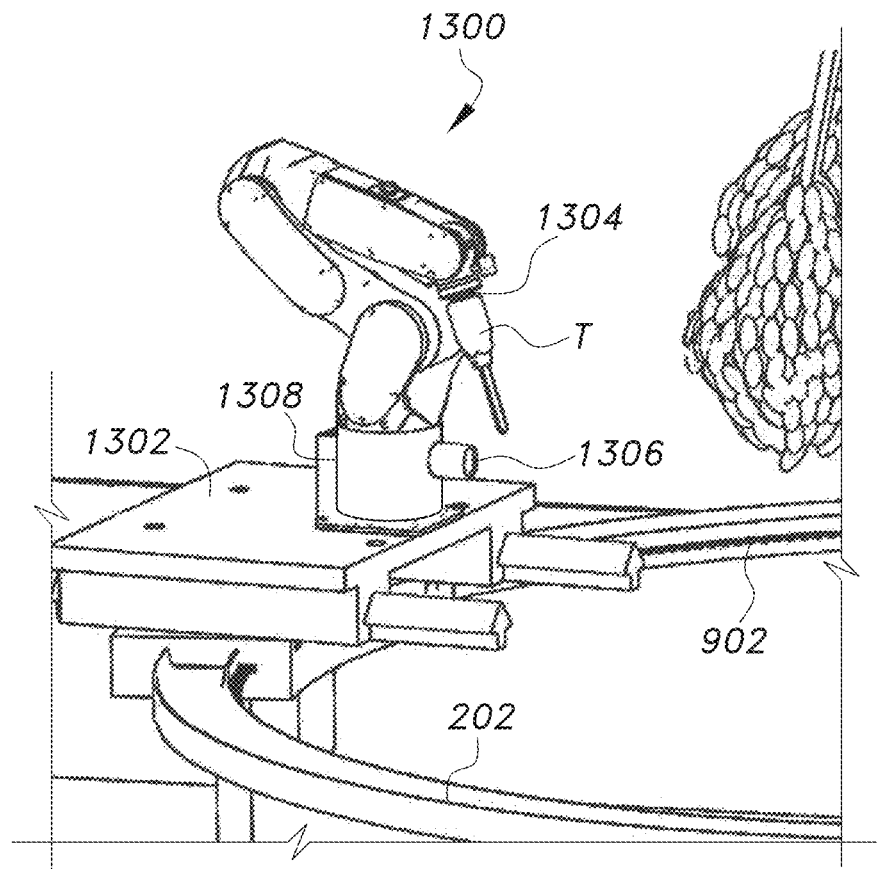
FIG. 13 is a fragmented, perspective side view of a robotic arm mounted on the two degree of freedom slider of FIG. 10.

As shown in FIG. 13, a robotic arm 1300 may be fixed on the upper surface 1302 of the tool platform 1002. The robotic arm 1300 is used to accomplish most of the tasks needed on palm trees, with the exception of the bagging task, which is done using a bagging system, as described below. The robotic arm 1300 has at least 6 DOF for sufficiently flexible movement. It is a medium weight robotic arm so that it can easily be supported on the circular track 102, while still providing enough strength to handle the appropriate tool T that is attached to its end effector 1304. A first camera 1306 is attached to the base 1308 of the robotic arm 1300. The camera 1306 has a wide field of view (FOV) to provide a global view of the working area. A second camera 1308 is fixed to the end effector 1304 of the robotic arm 1300. The camera 1308 has a normal FOV to provide a close view of the attached tool T.

Figure 14:
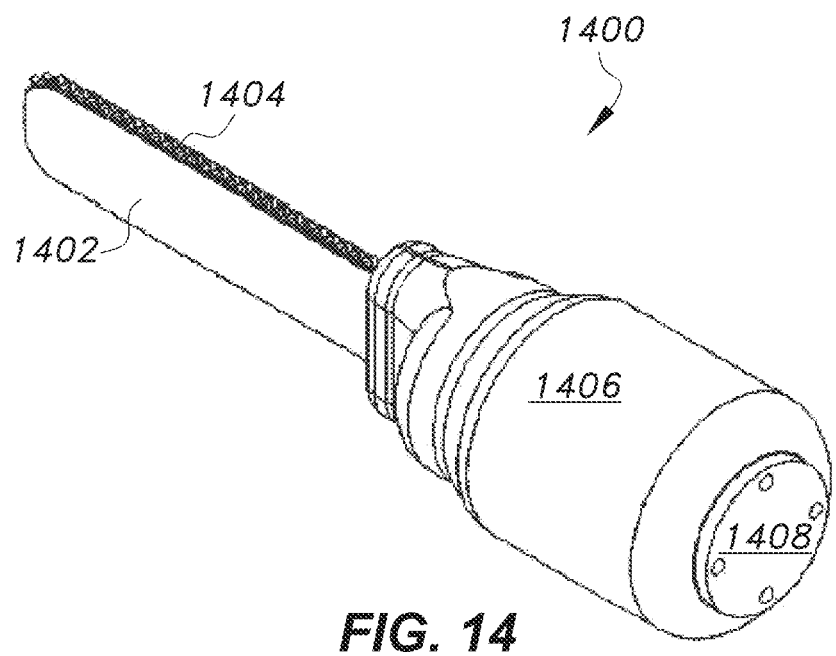
FIG. 14 is a perspective view of a saw attachment for the robotic arm of FIG. 13.
Figure 15:
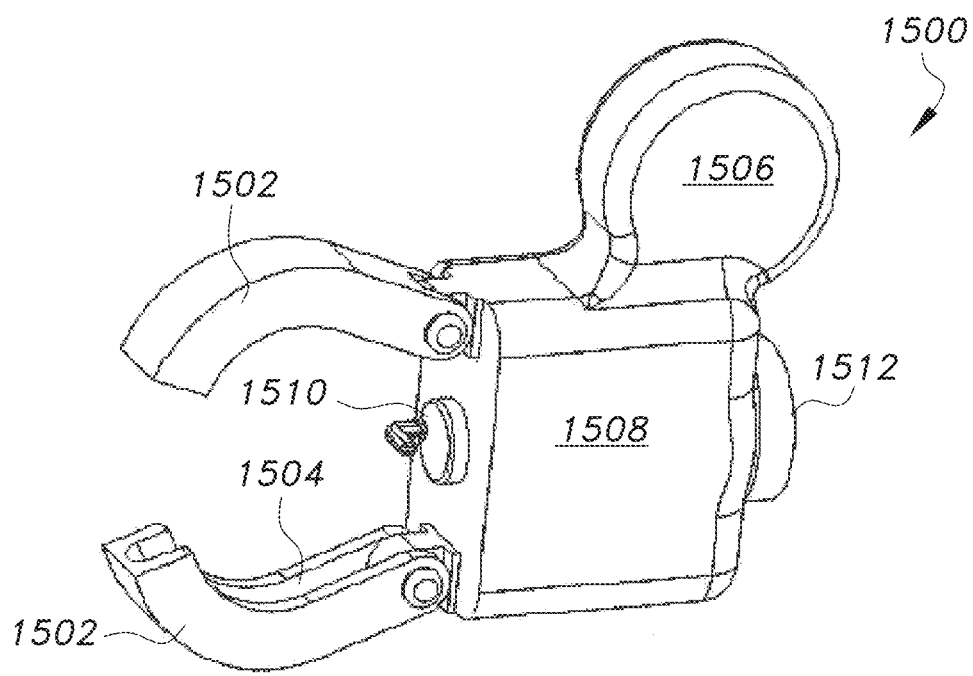
FIG. 15 is a perspective view of a wire wrapping attachment for the robotic arm of FIG. 13.

The tool T placed on the end effector 1304 of the robotic arm 1300 depends on the task to be operated on the palm tree PT. If the task to be performed is harvesting date bunches, dethroning, thinning the palm tree PT or post-harvesting, the operator will attach an electrical saw 1400 to the end effector 1304 of the robotic arm 1300, as shown in FIG. 14. The electric saw 1400 includes a chain saw blade 1402 having a saw chain 1404 mounted thereon and an internal electric motor (not shown) in its body 1406 for driving the saw chain 1404 around the chain saw blade 1402, as is known with conventional chain saws. Attaching means 1408 are provided on the rear surface of the electric saw body 1406 for attaching the electric saw 1400 to the end effector 1304 and providing the necessary electrical connections. If the task to be performed is bunch alignment, the operator will attach a bander 1500 to the end effector 1304, as shown in FIG. 15. The bander 1500 has two wire directing fingers 1502 rotatably attached to the body 1508 of the bander 1500. Each finger 1502 has a wire directing groove 1504. The fingers 1502 are closed to surround the tree part(s) that needs to be banded. An electrically driven internal wire roll (not shown) is housed in an upper part 1506 of the bander body 1508. After the fingers 1502 are closed, the wire roll is driven to drive the wire through the grooves 1504 and around the part(s) to be banded. A wire-twisting mechanism 1510 is then activated to twist the wire to itself to complete the banding process. Attaching means 1512 are provided on the rear surface of the bander body 1508 for attaching the bander 1500 to the end effector 1304 and providing the necessary electrical connections.

Figure 16:
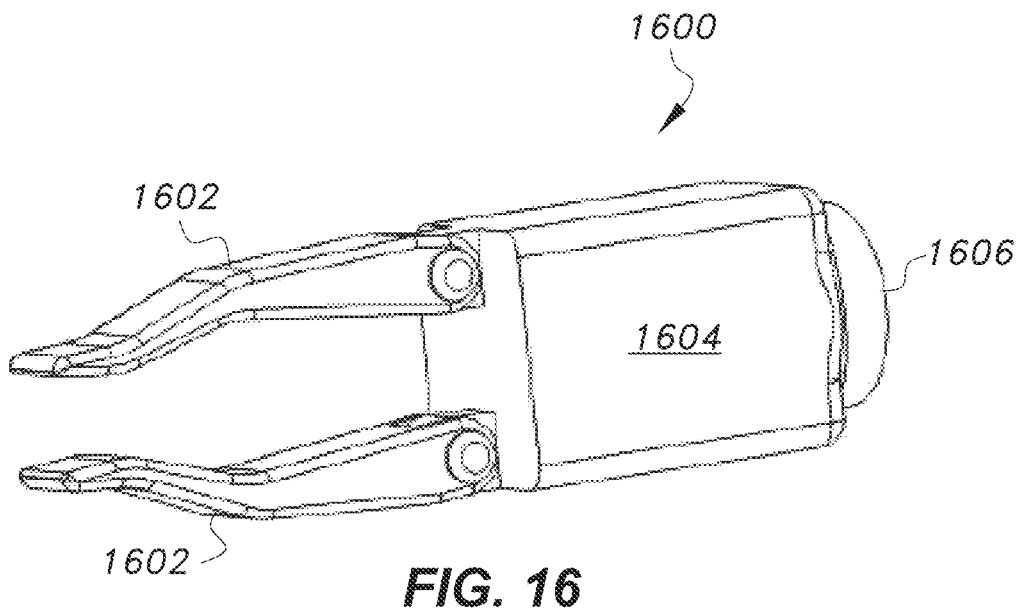
FIG. 16 is a perspective view of a gripping attachment for the robotic arm of FIG. 13.
Figure 17:
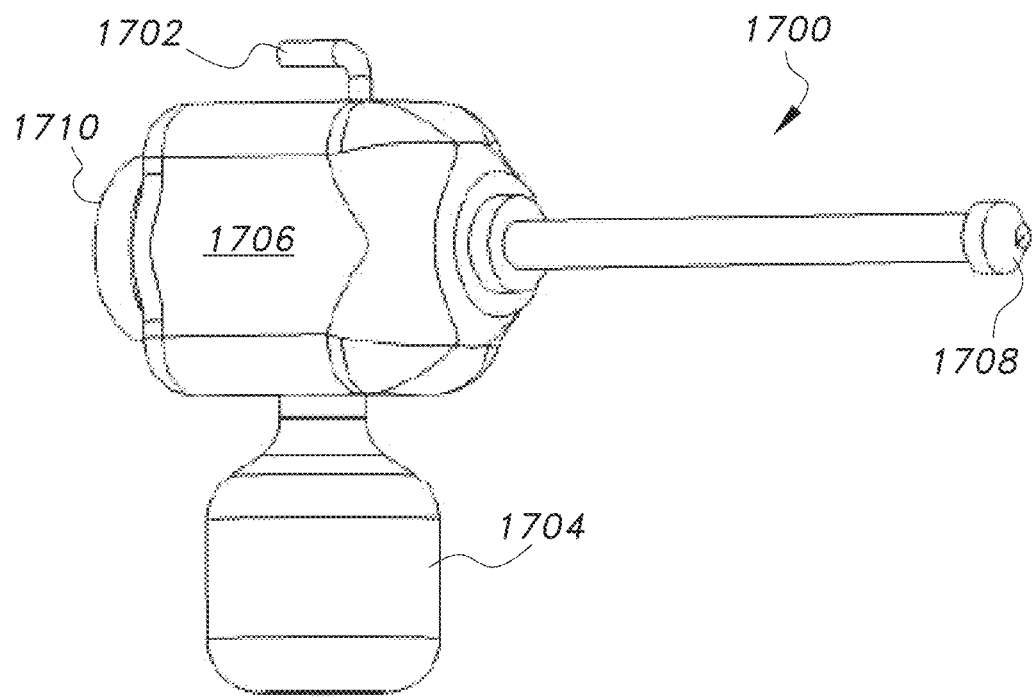
FIG. 17 is a perspective view of a spraying attachment for the robotic arm of FIG. 13.

If the task to be performed is harvesting individual dates, the operator will attach a small gripper 1600 to the end effector 1304 of the robotic arm 1300, as shown in FIG. 16. The gripper 1600 includes two gripper fingers 1602 rotatably attached to the gripper body 1604 of the gripper 1600. Attaching means 1606 are provided on the rear surface of the gripper body 1604 for attaching the gripper 1600 to the end effector 1304 and providing the necessary electrical connections. If the task to be performed is pollination, dust removal or date spider removal, the operator will attach a sprayer tool 1700 to the end effector 1304 of the robotic arm 1300, as shown in FIG. 17. The sprayer tool 1700 has an input 1702 for compressed air or water to spray on the palm tree PT, and a soap container 1704 for providing soap or other product to mix with the water in the housing 1704 of the sprayer tool 1700, if the task performed is date spider removal. The mixture is supplied to an adjustable spray nozzle 1708 that can be adjusted between a wide angle spray and a small angle (jet) spray. Attaching means 1710 are provided on the rear surface of the housing 1704 for attaching the sprayer tool 1700 to the end effector 1304 and providing the necessary electrical connections.

Figure 19:
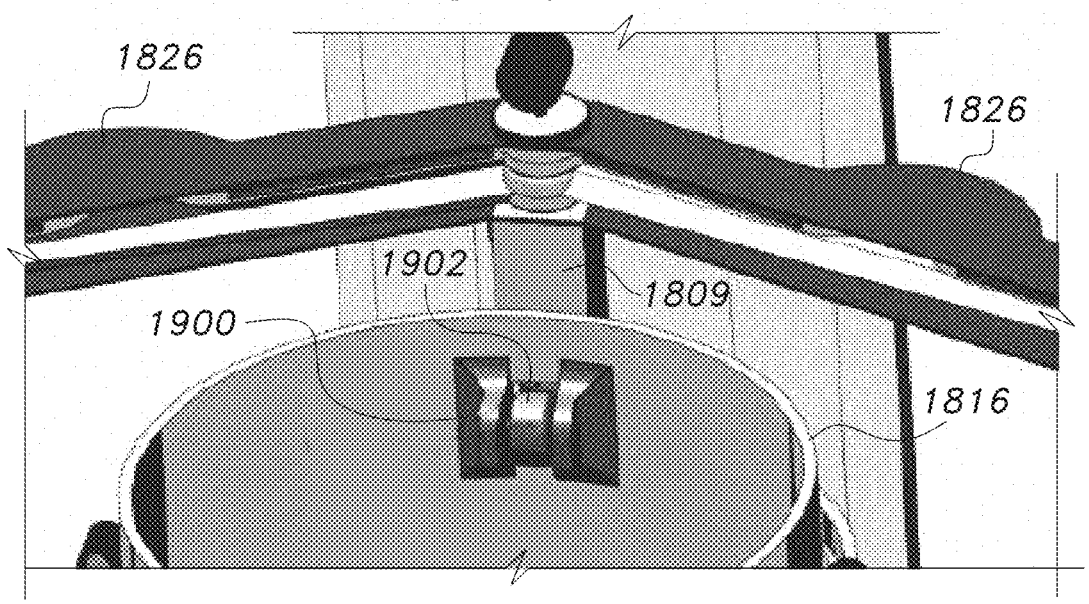
FIG. 19 is an enlarged, fragmented, perspective inner view of the bagging system of FIG. 18.

To perform the task of bagging the fruit, the operator will attach a bagging system 1800 to the upper surface 1302 of the tool platform 1002, as shown in FIGS. 18 and 19. The bagging system 1800 includes a base 1802 with a vertical plate 1804 attached to and extending upward therefrom. The vertical plate 1804 includes two rails 1806 for supporting a vertically adjustable slider 1808 thereon. The vertical slider 1808 provides vertically adjustable support for a bagging apparatus 1810. A vertical mast 1809 supports the components of the bagging apparatus 1810. The bottom of the bagging apparatus 1810, includes a horizontal pole 1812 for supporting a roll of plastic mesh (bagging material) 1814. The bagging material may be formed from a thermoplastic material or any other type of suitable thermally sealable material. Above the roll of plastic mesh 1814, is a cylindrical bag shaper 1816 having a frustoconical lower portion 1818 for guiding the plastic mesh around the cylindrical bag shaper 1816 to form a bag, as described below in detail.

A circular guide 1820 maintains the plastic mesh in close proximity to the cylindrical bag shaper 1816, and two electrically driven bagging material advancing belts 1822, (one shown, the other belt being mounted diametrically opposite to the visible belt), pulls the plastic mesh upward, once it has been wrapped around the cylindrical bag shaper 1816. Above the cylindrical bag shaper 1816 are a pair of cutting blades 1824 that are rotatably attached to the vertical mast 1809. The cutting blades 1824 can be rotated together for cutting the plastic mesh 1814, as described further below. Above the cutting blades 1824 are a pair of electric thermal gluing fingers 1826 that are rotatably attached to the vertical mast 1809. The thermal gluing fingers 1826 are rotated together and activated to close a formed bag above and below a fruit bunch, as described further below. A pair of rotating covers 1826 are rotatably attached to the vertical mast 1809 and can be rotated together to cover and protect the cutting blades 1824 and the electric thermal gluing fingers 1826.

A bagging operation camera 1828 is mounted on the top of the vertical mast 1809 for transmitting images of the bagging operation to the touch screen 508. A vertical welder 1900 includes two heated rollers 1902 and 2002 (see FIG. 20D). The first heated roller 1902 is mounted within the cylindrical bag shaper 1860 and extends through a hole in the cylindrical bag shaper 1860, and the second heated roller 2002 is mounted on the vertical mast 1809 in alignment with the first heated roller 1902 to weld the two edges of the bagging material to form a plastic bag that will be used in the bagging process, as shown in FIGS. 20A-20L.

Figure 20A:
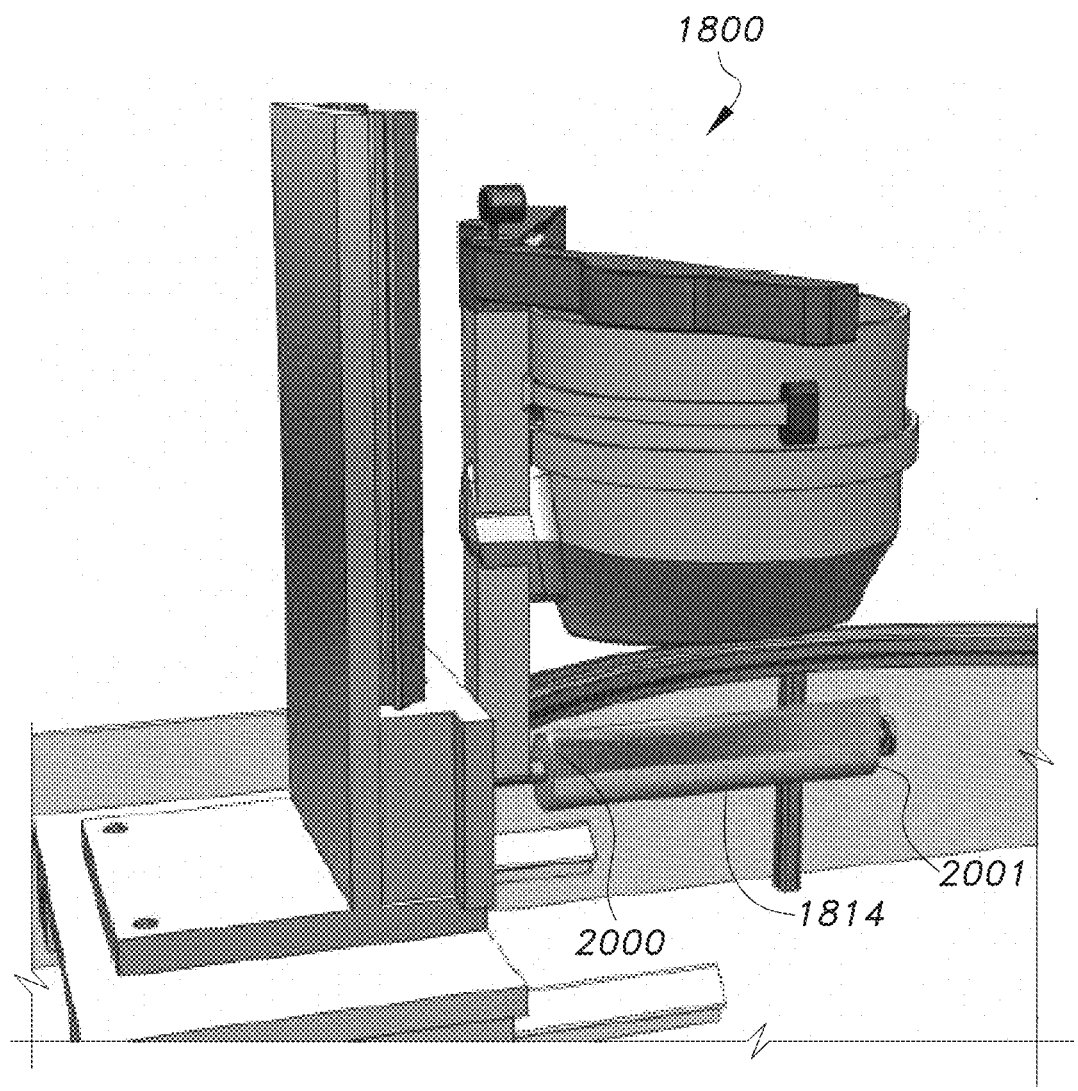
FIGS. 20A, 20B, 20C, 20D, 20E, 20F, 20G, 20H, 20I, 20J, 20K and 20L are environmental perspective views showing a series of views illustrating the steps of a bagging operation, performed using the bagging system of FIG. 18.
Figure 20B:
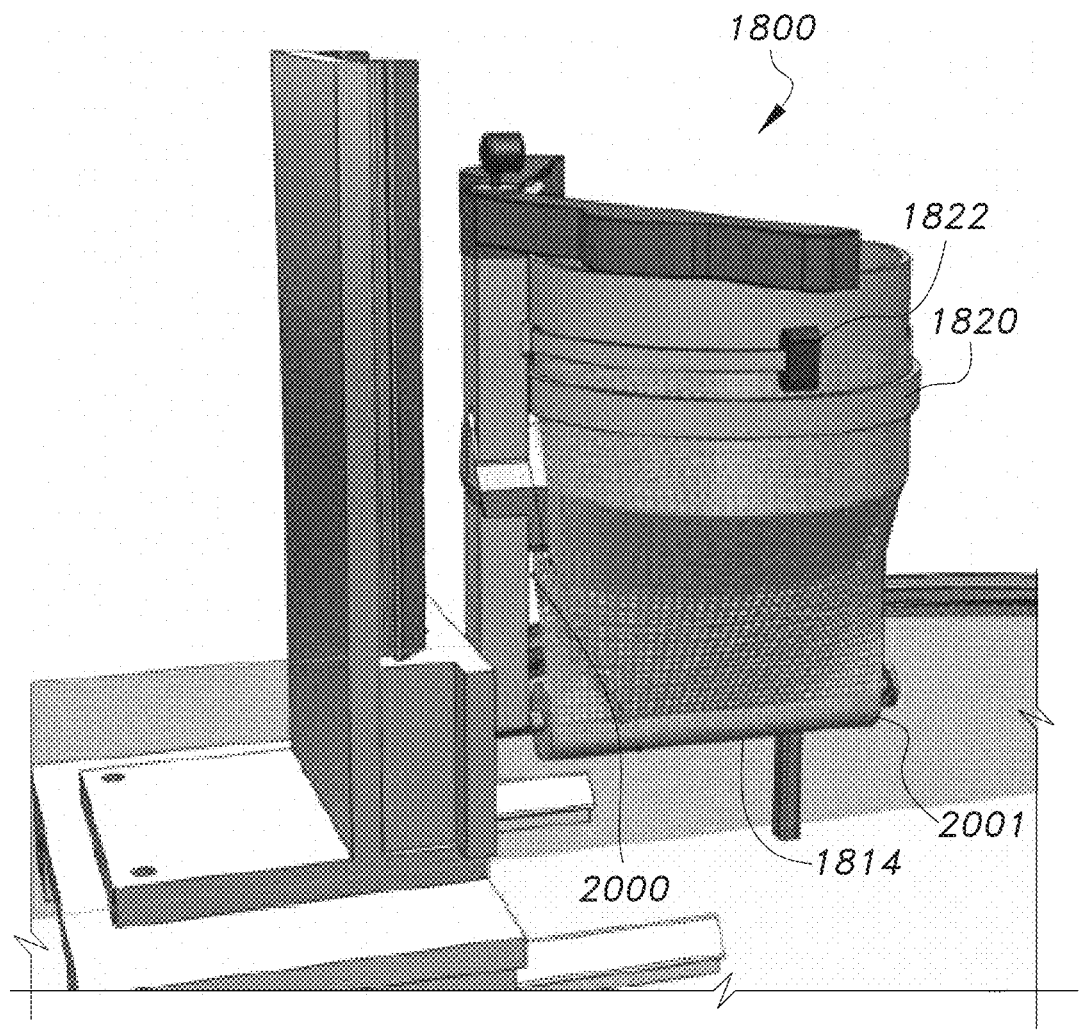

The task of bagging the fruit is shown in FIGS. 20A-20L. In an initial position, as shown in FIG. 20A, the bagging material is provided pre-folded on the horizontal pole 1812, such that the inside of the roll has two free edges 2000 of bagging material and the outside of the roll has the fold of the bagging material. The bagging material is initially manually unwound from the roll, pulled upward, and wrapped around the cylindrical bag shaper 1816 under the circular guide 1820 and the electrically driven bagging material advancing belts 1822, as shown in FIG. 20B. The two free edges 2000 of bagging material are manually guided between the first heated roller 1902 and the second heated roller 2002. Once these steps have been taken, the process continues without manual intervention.

Figure 20C:
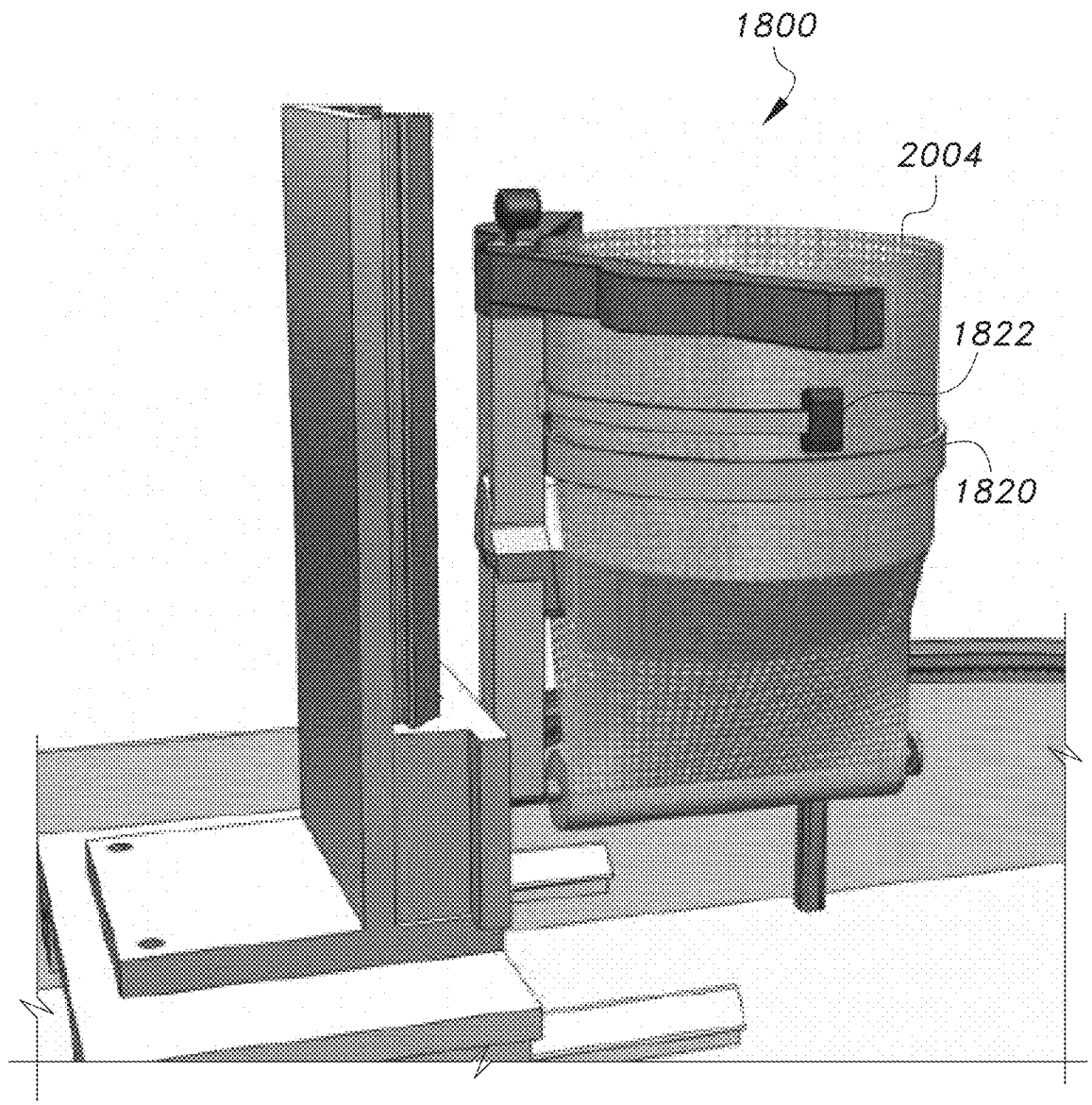
Figure 20D:
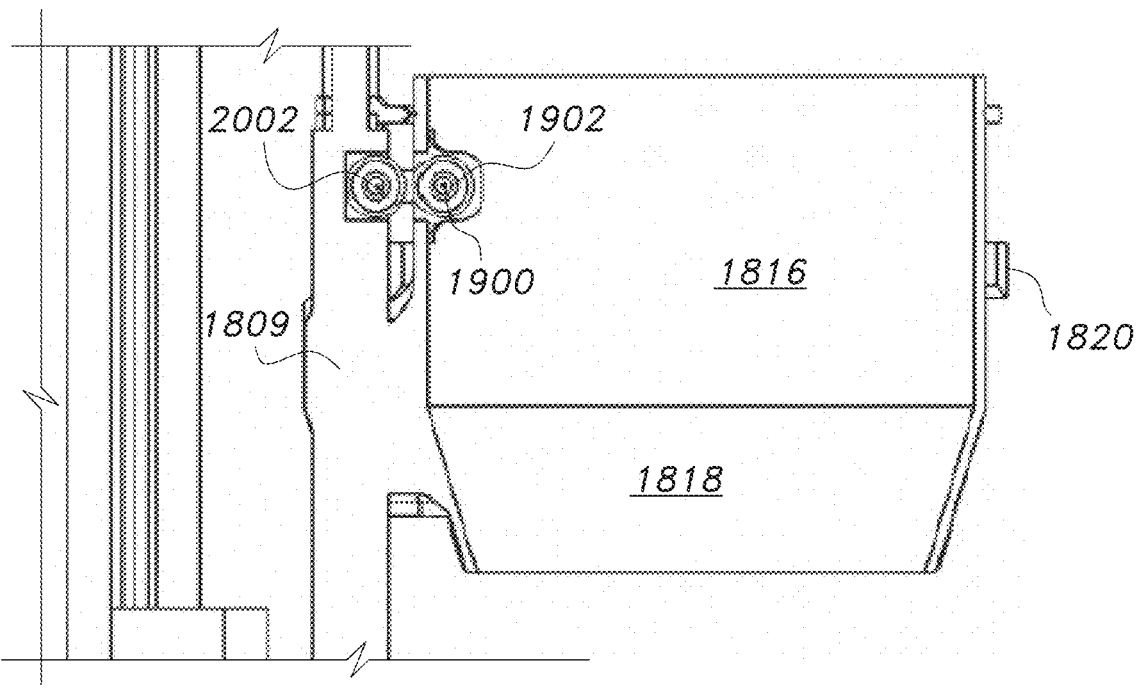
Figure 20E:
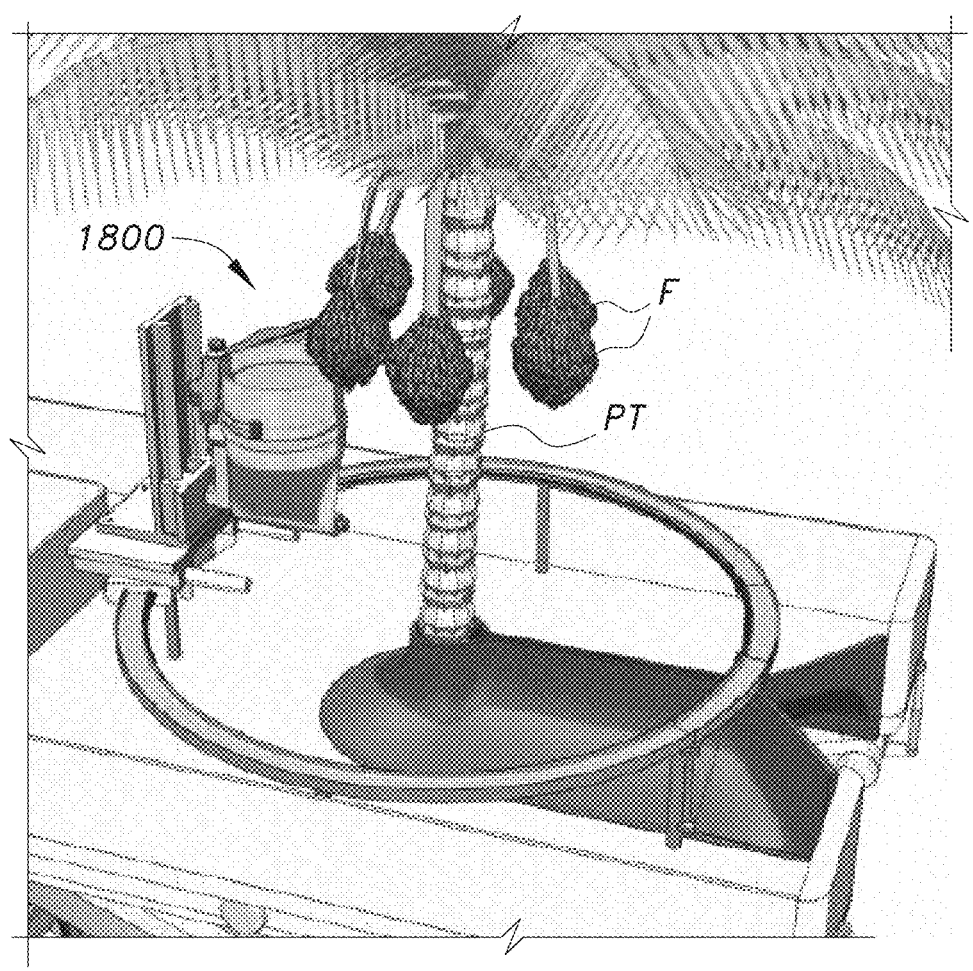
Figure 20F:
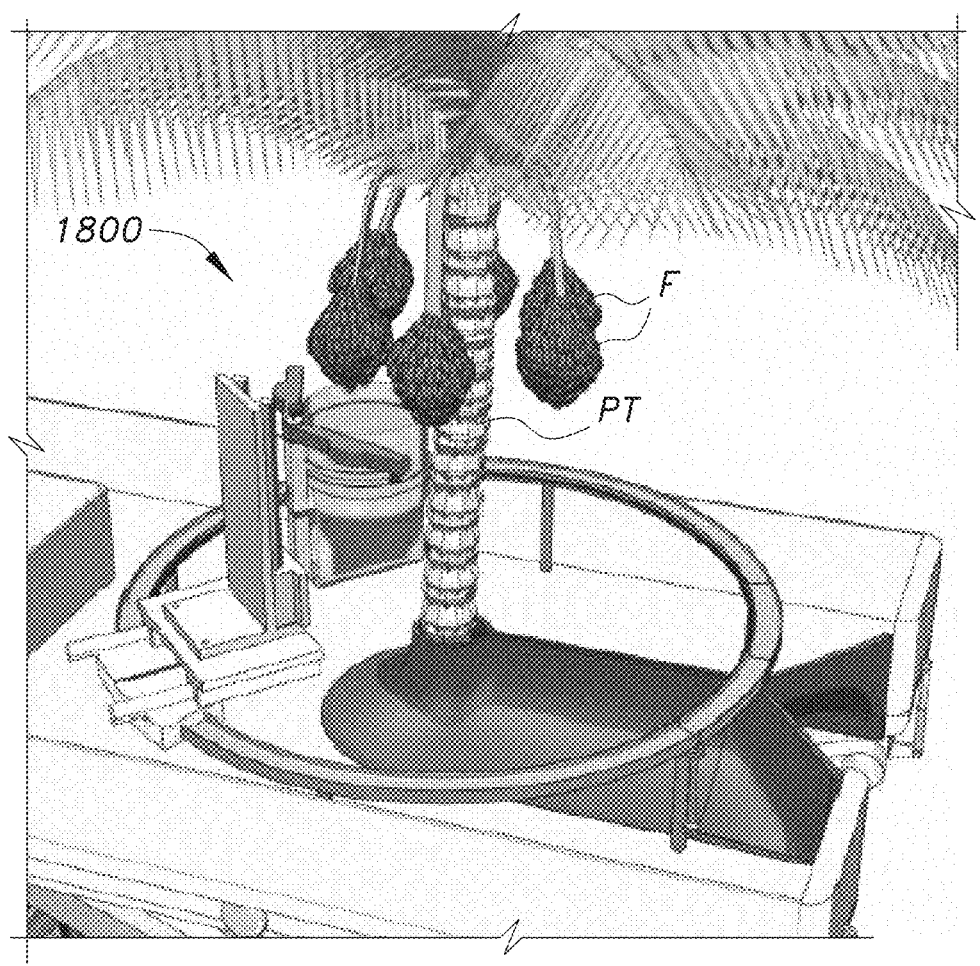
Figure 20G:
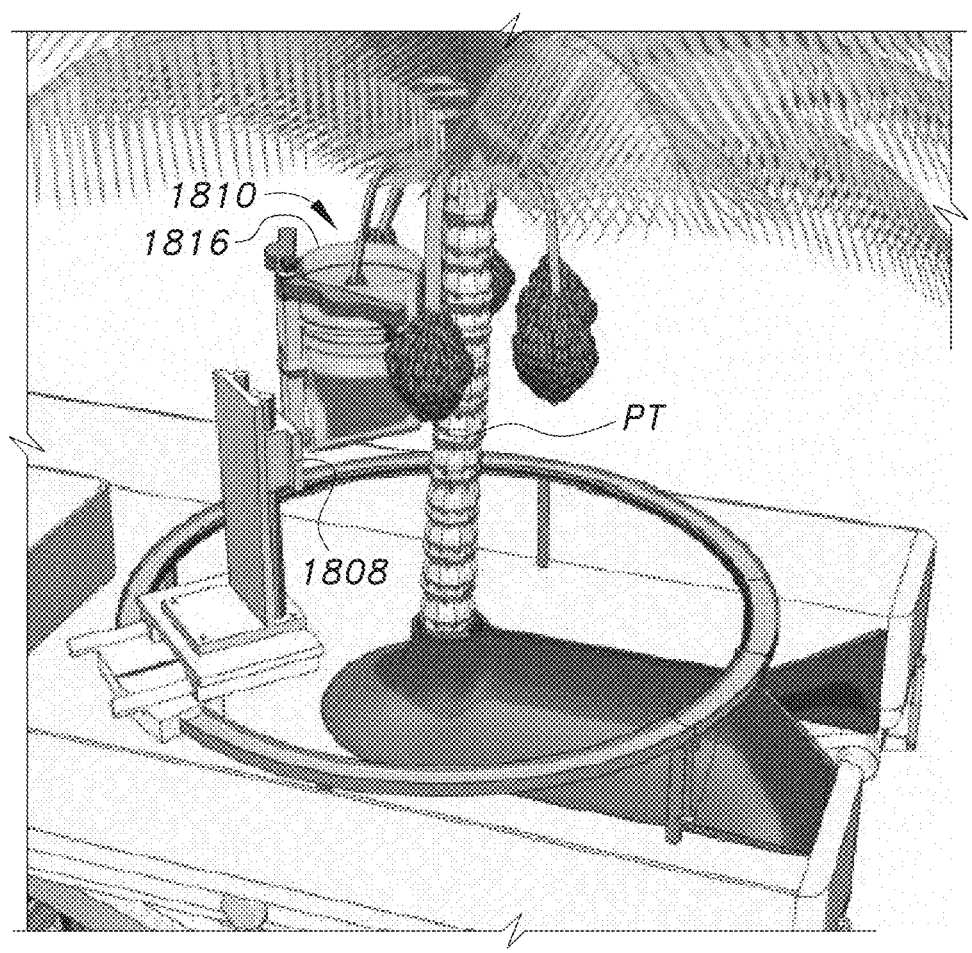
Figure 20H:
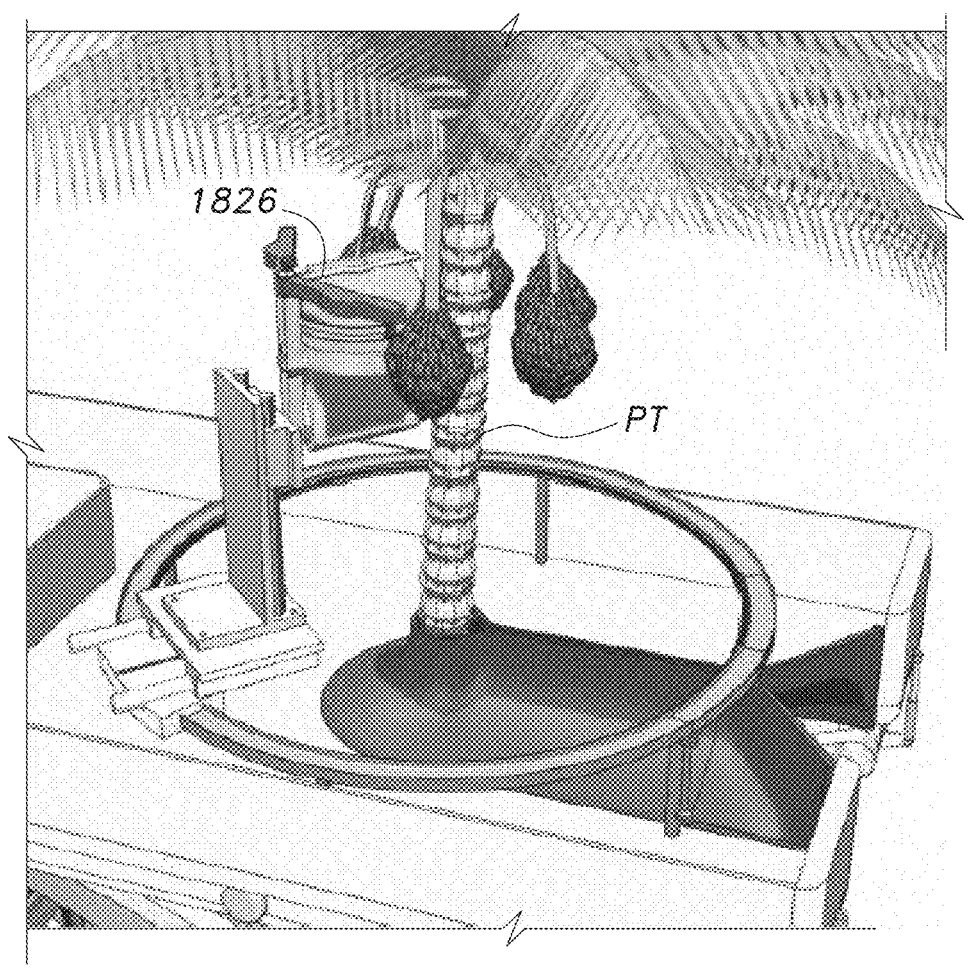
Figure 20I:
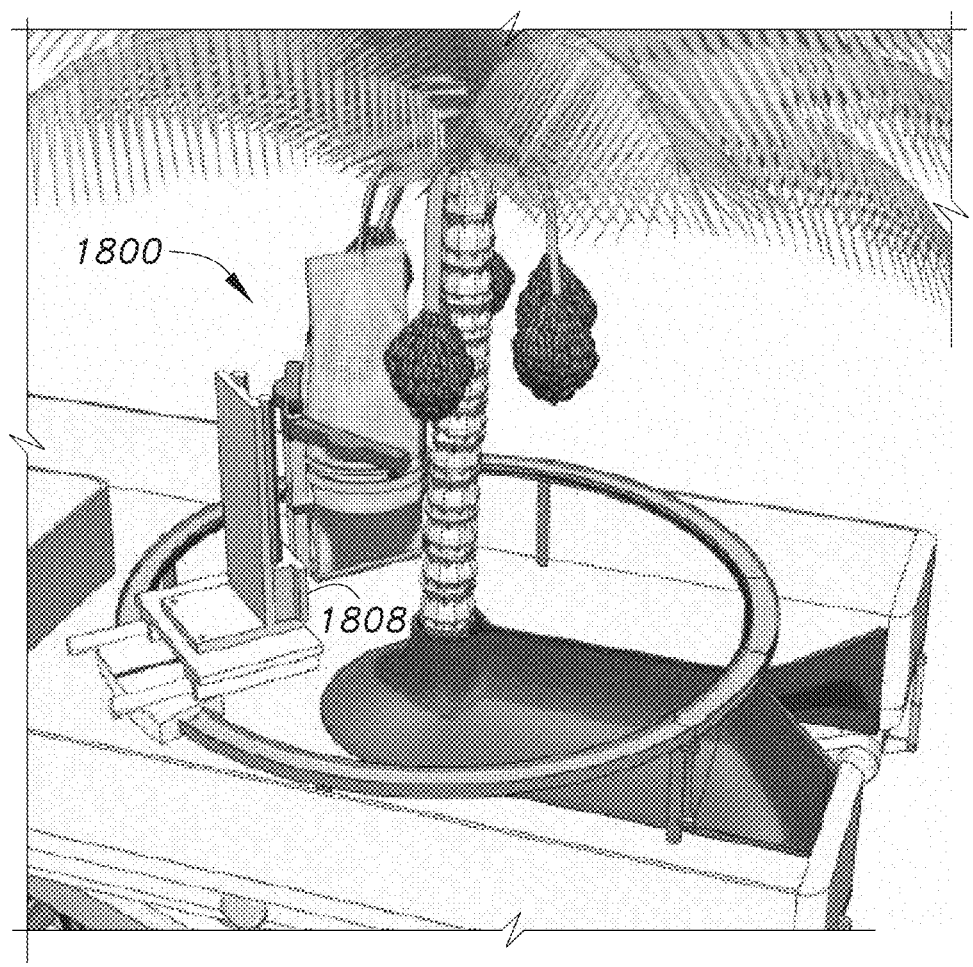
Figure 20J:
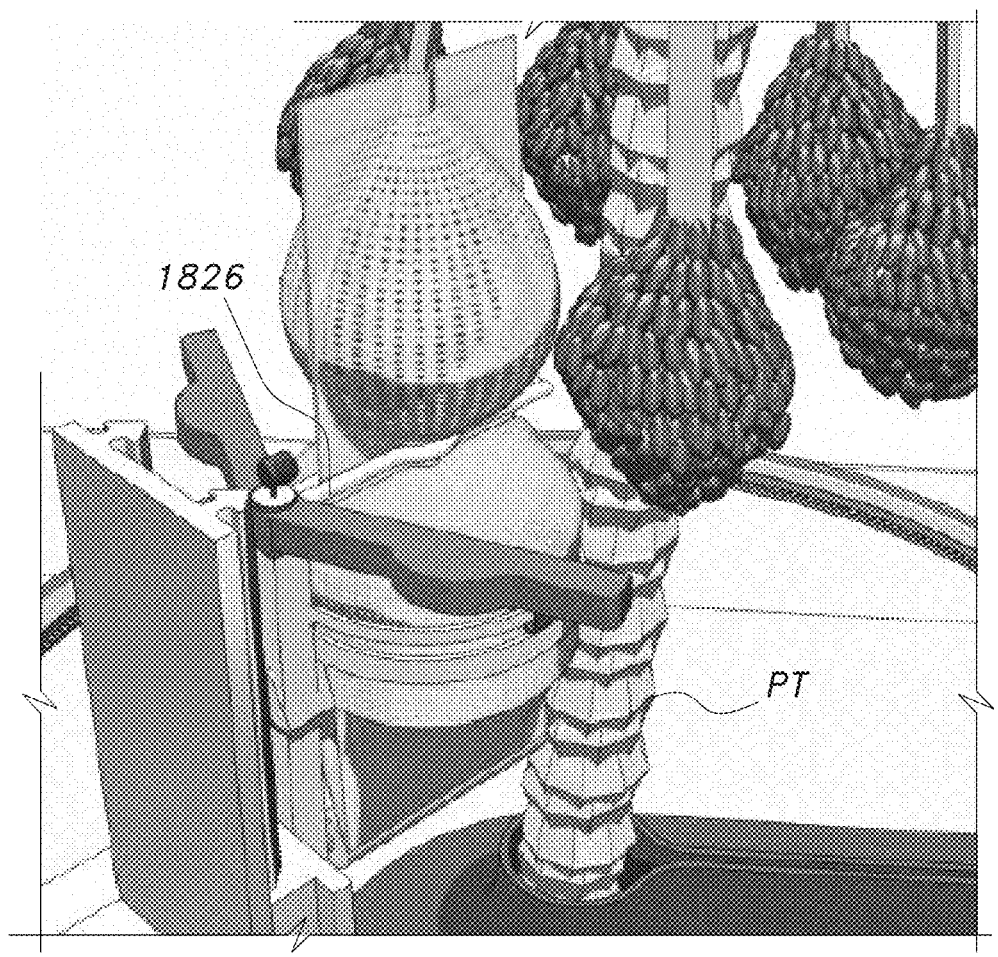
Figure 20K:
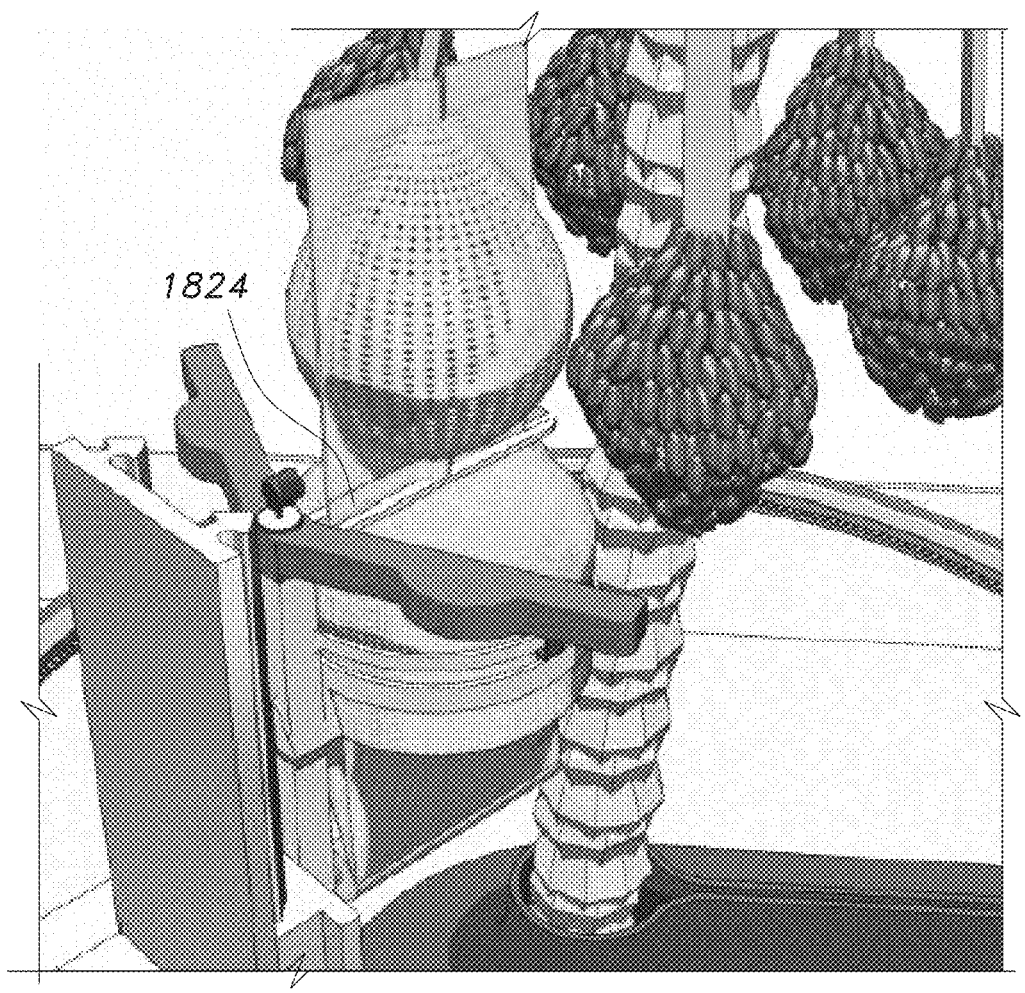
Figure 20L:
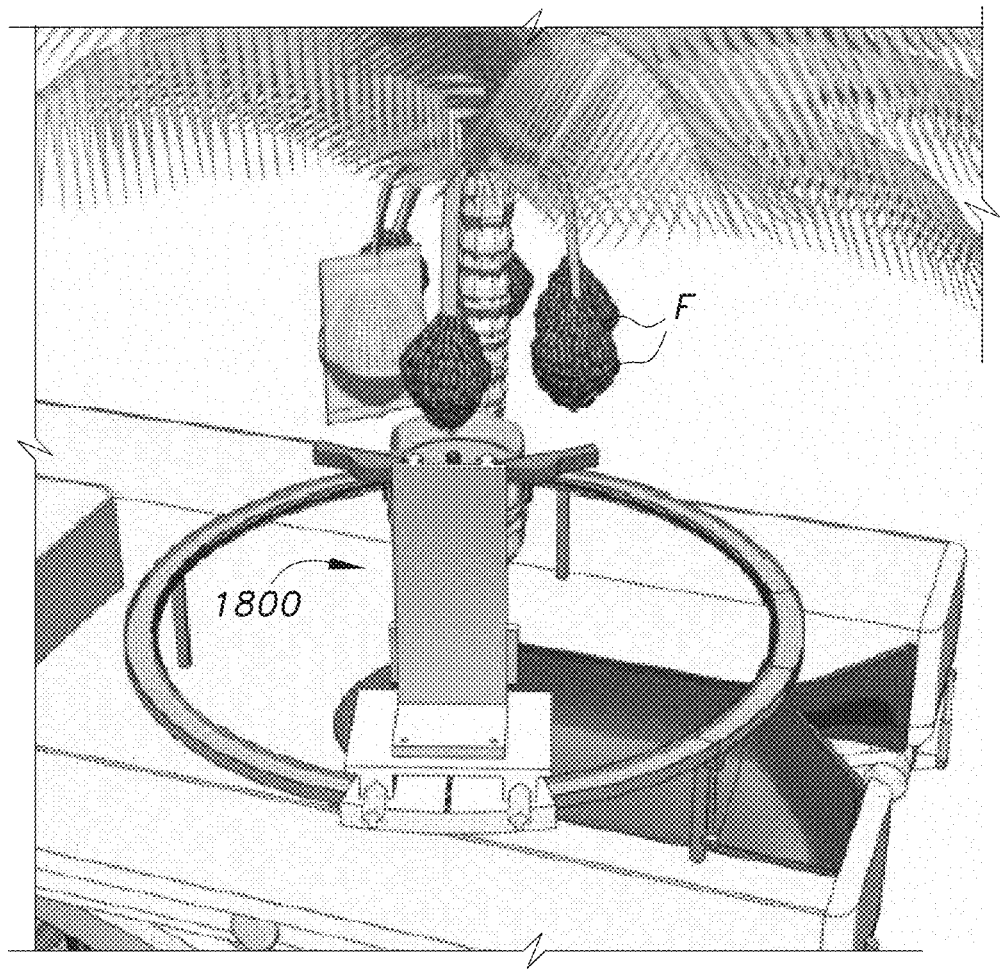

As shown in FIG. 20C, as the bagging material is pulled upward by the material advancing belts 1822, the vertical welder 1900 connects the two free edges 200 to form a cylinder 2004 of the plastic mesh bagging material. As shown in FIG. 20E, the bagging system 1800 is now ready to be positioned under the first fruit bunch F to be bagged. FIG. 20F shows the bagging system 1800 positioned under a first fruit bunch F to be bagged. As shown in FIG. 20G, the bagging apparatus 1810 has been raised using the vertical slider 1808 until the fruit bunch F is completely within the cylindrical bag shaper 1816. The cylinder 2004 of the plastic mesh bagging material is advanced upward by the bagging material advancing belts 1822, and the thermal gluing fingers 1826 are rotated together and activated to close the formed bag above the fruit bunch F, as shown in FIG. 20H. The bagging apparatus 1810 is then lowered to a point below the fruit bunch F using the vertical slider 1808, as shown in FIG. 20I. As shown in FIG. 20J, the thermal gluing fingers 1826 are again rotated together and activated to close the formed bag below the fruit bunch F. Once the bag has been sealed, the cutting blades 1824 can be rotated together to cut the plastic mesh 1814, thereby completing the bagging of the fruit bunch F, as shown in FIG. 20K. The bagging system 1800 is then moved into position under another fruit bunch F to be bagged, as shown in FIG. 20L, and the process continues as outlined above.

Figure 6:
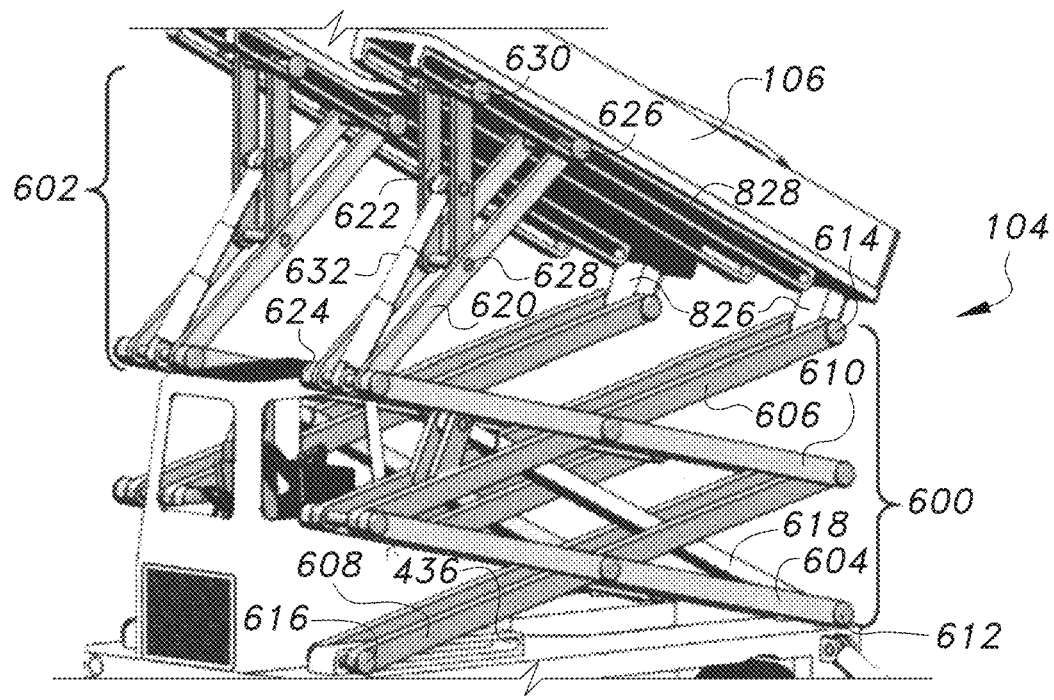
FIG. 6 is a perspective view of the scissor lift and tilt mechanism of FIG. 3B, showing the scissor lift and tilt mechanism mounted on the vehicle platform of FIG. 3A.

As shown in FIG. 6, the scissor lift system 104 includes identical left and right mechanisms. Each scissor lift mechanism is divided into two sub-systems, a lifting sub-system 600 and an inclining sub-system 602. The lifting sub-system 600 lifts the multi-task platform 106 to the top of the palm tree PT, while the inclining sub-system 602 is used to incline the multi-task platform 106 to discharge collected fruits, as described further below. The sub-systems will be described with respect to the left sub-systems, it being understood the description applies to the right sub-systems as well.

The lifting sub-system 600 includes a dual-bar lower rear linkage 604, a dual-bar upper rear linkage 606 rotatably mounted on its lower end to the upper end of the dual-bar lower rear linkage 604, a dual-bar lower front linkage 608, and a dual-bar upper front linkage 610 rotatably mounted on its lower end to the upper end of the dual-bar lower front linkage 608. The lower end of the dual-bar lower rear linkage 604 is mounted to the rear scissor lift bearing supports 434 by a lower lift rotational bearing 612 that extends through the rear scissor lift bearing support 434 (FIG. 4) and through holes in the lower ends of the dual bars of the lower rear linkage 604. The dual-bar upper rear linkage 606 is rotatably connected to the rear scissor lift bearing supports 826 by an upper rear scissor lift bearing 614 extending through the rear scissor lift bearing support 826 and through holes in the upper ends of the dual bars of the upper rear linkage 606. The lower end of the dual-bar lower front linkage 608 is slidably and rotatably mounted to the front scissor lift sliding bearing housing 436 by a lower sliding bearing 616 extending through the front scissor lift sliding bearing housing 436 and through holes in the lower ends of the dual bars of the lower front linkage 608. The dual-bar upper front linkage 610 supports the bottom of the inclining sub-system 602, as described further below. A lifting pneumatic or hydraulic cylinder 618 rotates the linkages 604 and 606, (and the connected linkages 608 and 610) relative to each other to raise and lower the multi-task platform 106, as is known in conventional scissor lifts. It should be understood that additional sets of linkages may be provided between the upper 606, 610 and the lower 604, 608 linkages to provide a greater lift height for taller palm trees.

The inclining sub-system 602 includes a primary dual-bar linkage 620 and a secondary dual-bar linkage 622. The lower end of the primary dual-bar linkage 620 is rotatably connected to the upper end of the dual-bar upper front linkage 610 by an upper front scissor lift bearing 624 extending through holes in the upper ends of the dual bars of the upper front linkage 610 and through holes in the lower end of the dual bars of the primary linkage 620. The upper end of the primary dual-bar linkage 620 is rotatably and slidably connected to the front scissor lift sliding bearing housing 828 by a primary upper bearing 626 extending through the front scissor lift sliding bearing housing 828 and through holes in the upper end of the dual bars of the primary linkage 620. The lower end of the secondary dual-bar linkage 622 is rotatably attached to the approximate center of the primary linkage 620 by a secondary lower bearing 628 that extends through holes in the approximate centers of the dual bars of the primary linkage 620 and through holes in the lower end of the dual bars of the secondary linkage 622. The upper end of the secondary dual-bar linkage 622 is rotatably and slidably connected to the front scissor lift sliding bearing housing 828 by a secondary upper bearing 630 extending through the front scissor lift sliding bearing housing 828 and through holes in the upper end of the dual bars of the secondary linkage 622. An inclining pneumatic or hydraulic cylinder 632 rotates the secondary linkage 622 relative to the primary linkage 620 to thereby raise and lower the front end of the multi-task platform 106 relative to the tail end 810.

By combining a lifting sub-system 600 with an inclining sub-system 602, the scissor lift system 104 of the robotic system for harvesting and maintaining date palms 100 provides a both a lift and incline (or tilt) function in a single mechanism.

Figure 21:
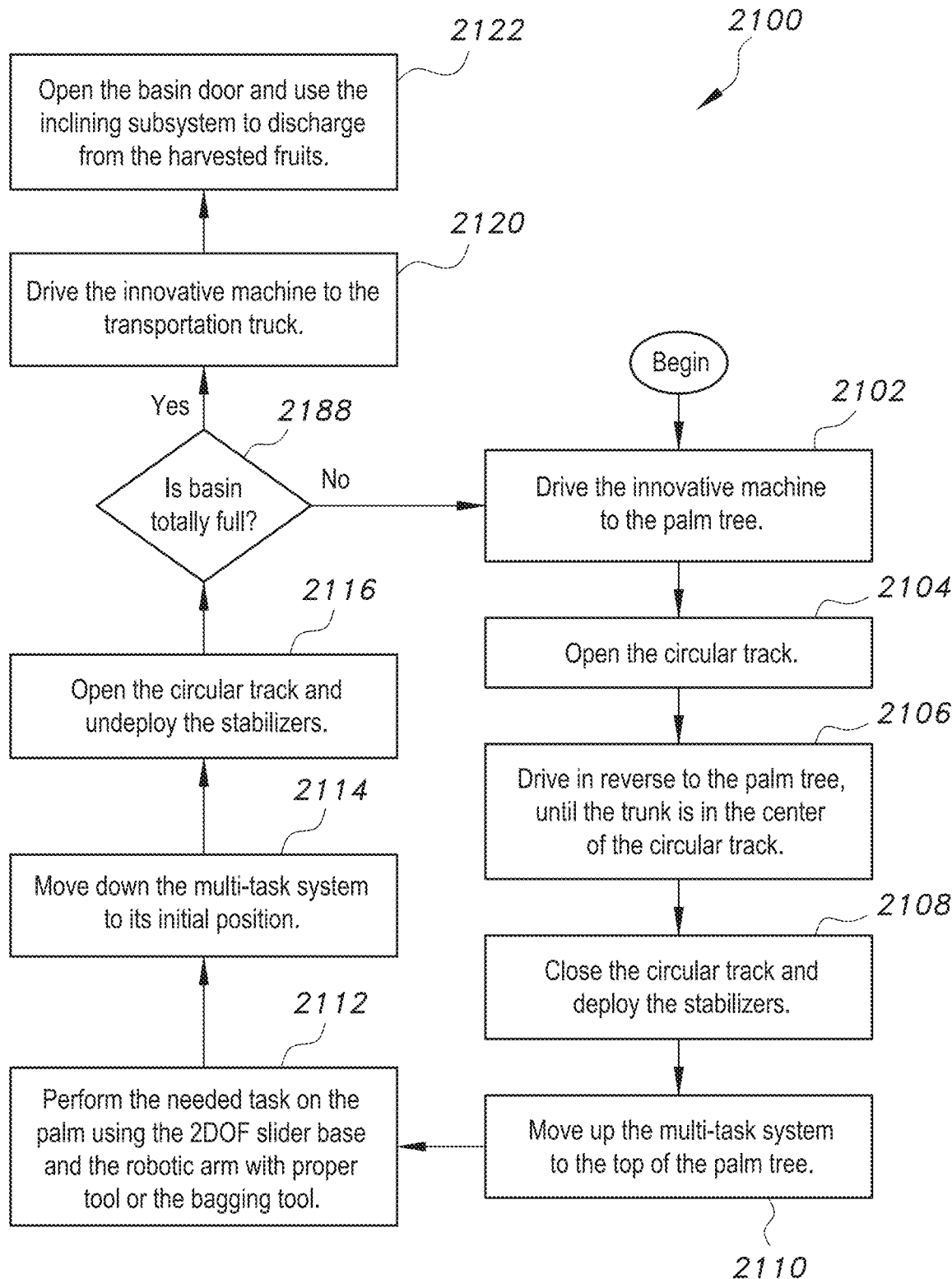
FIG. 21 is a flowchart showing the steps of a harvesting operation, preformed using the robotic system for harvesting and maintaining date palms of FIG. 1.
Figure 22A:
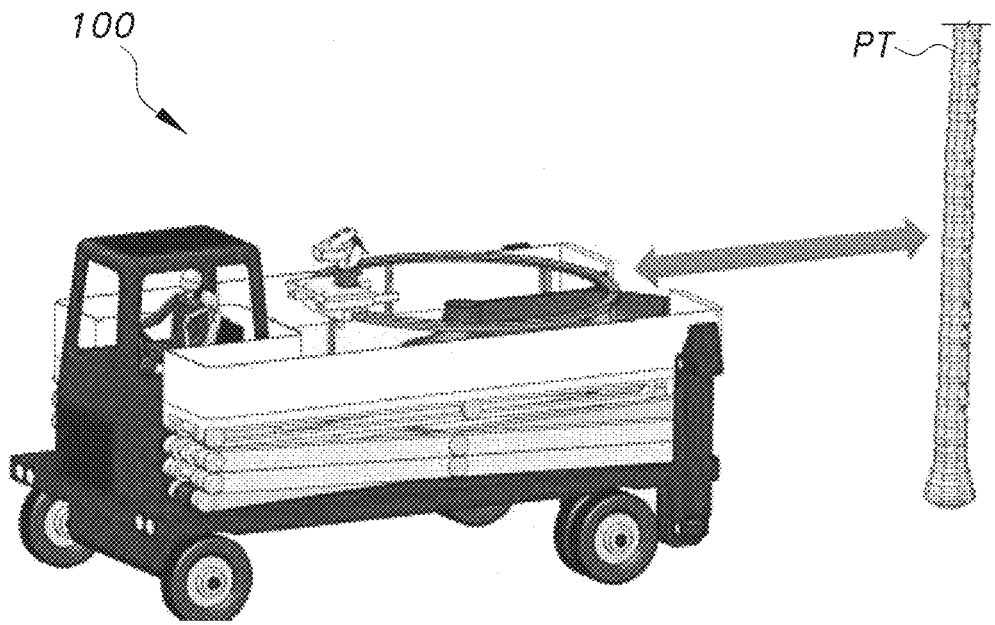
FIGS. 22A, 22B, 22C, 22D, 22E, 22F, 22G, 22H, 22I, 22J, 22K, 22L, and 22M are environmental perspective views showing a series of views illustrating the steps of the harvesting operation outlined in FIG. 21.
Figure 22B:
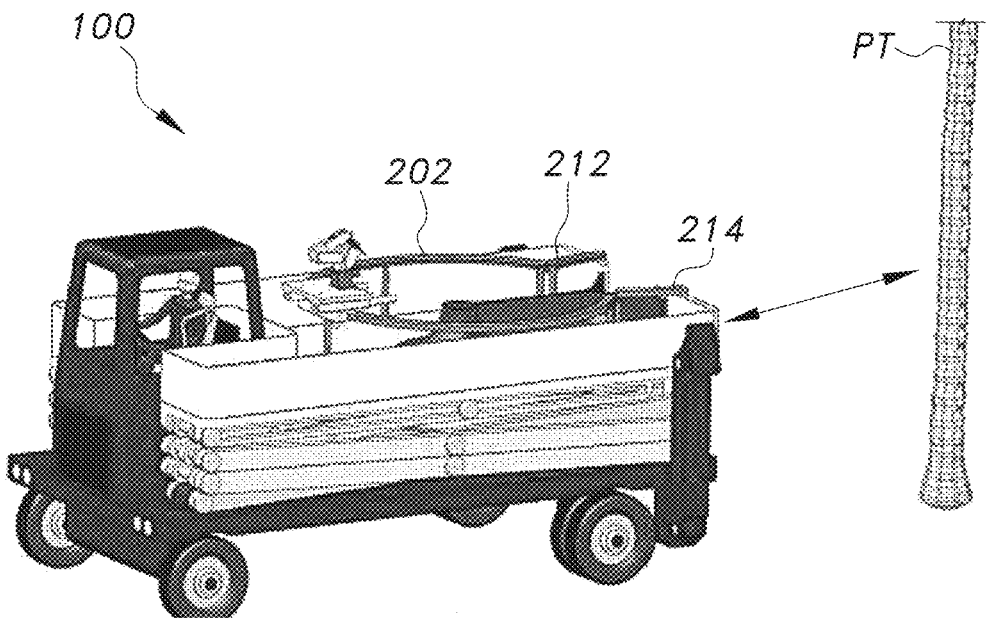
Figure 22C:
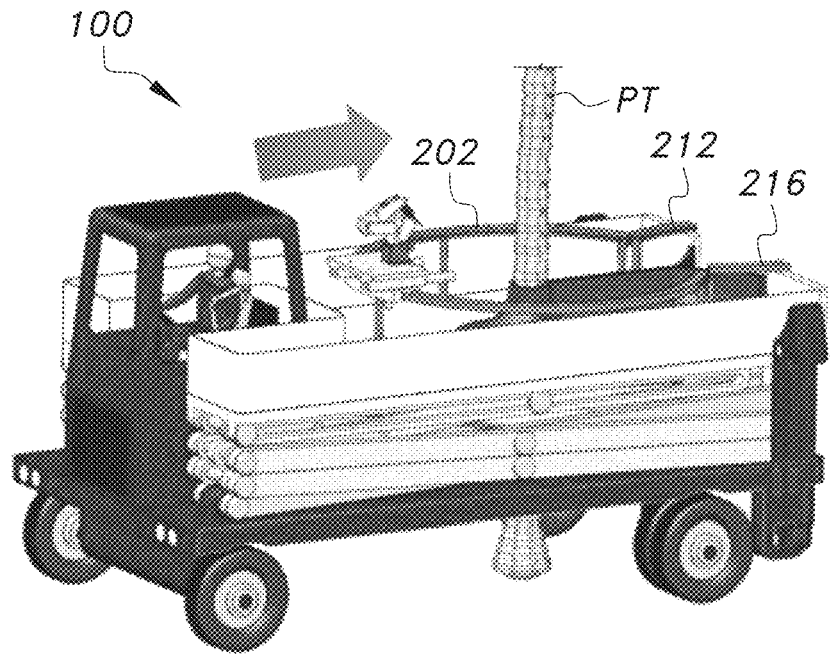
Figure 22D:
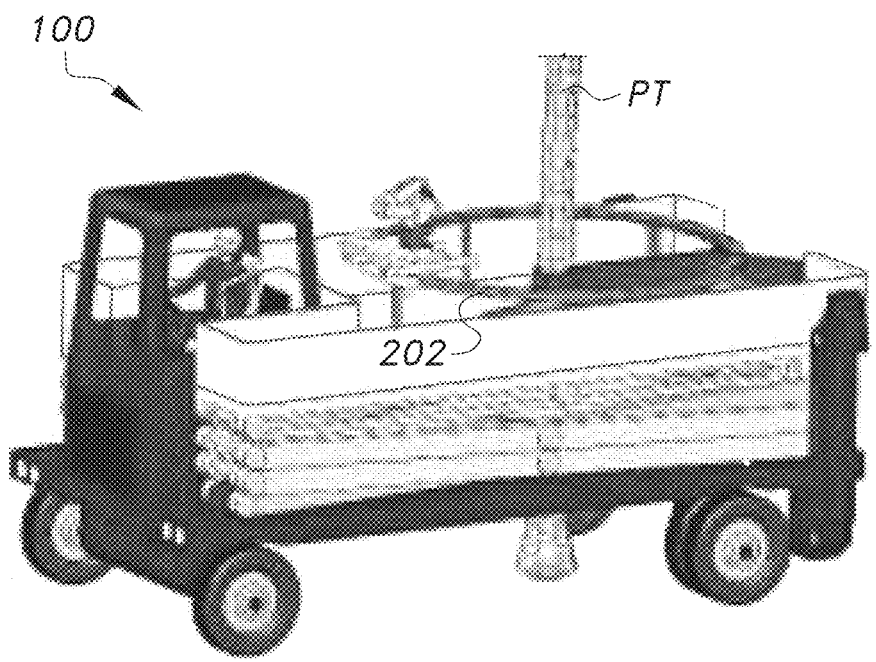
Figure 22E:
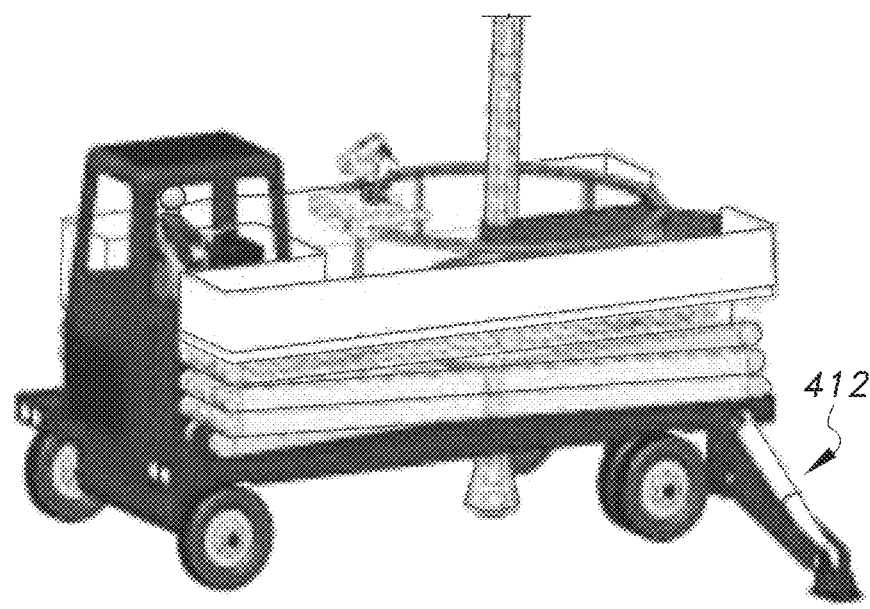
Figure 22F:
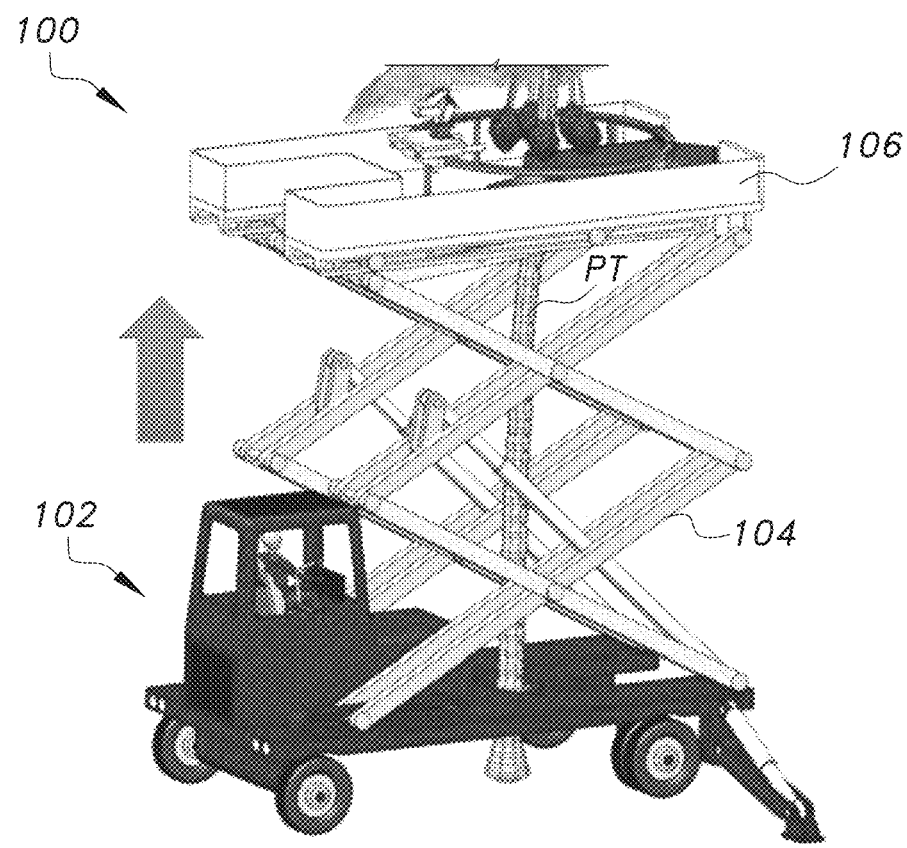
Figure 22G:
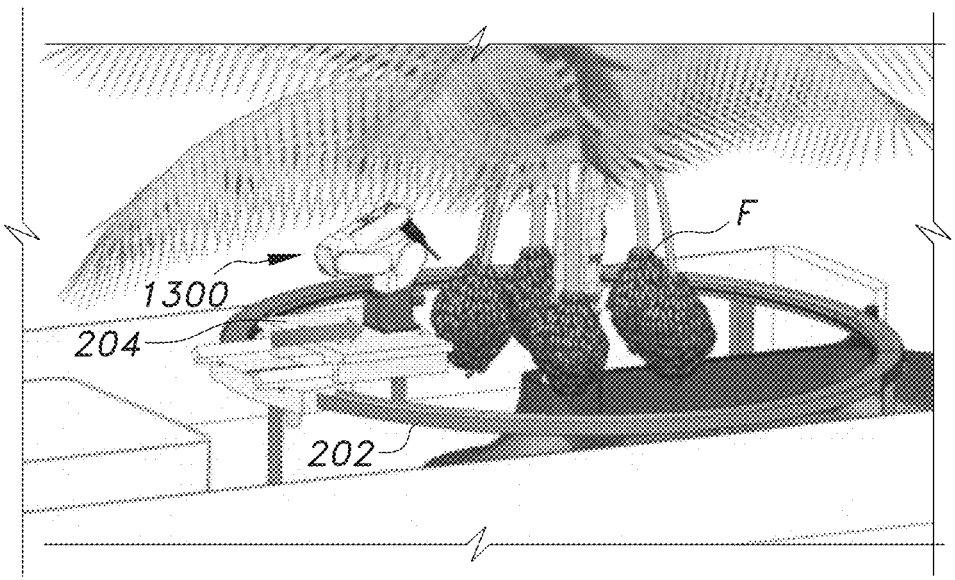
Figure 22H:
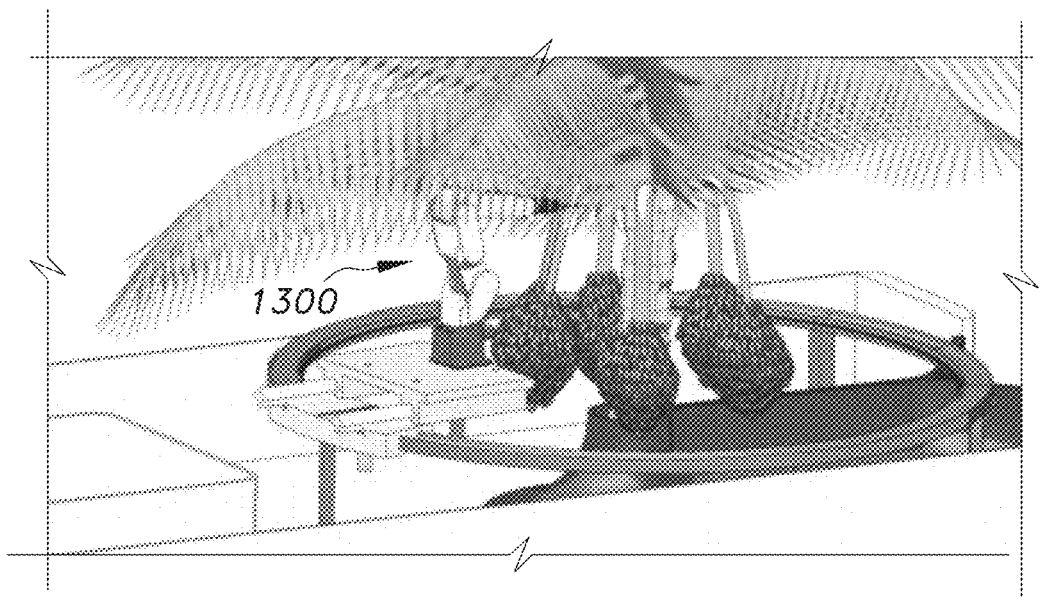
Figure 22I:
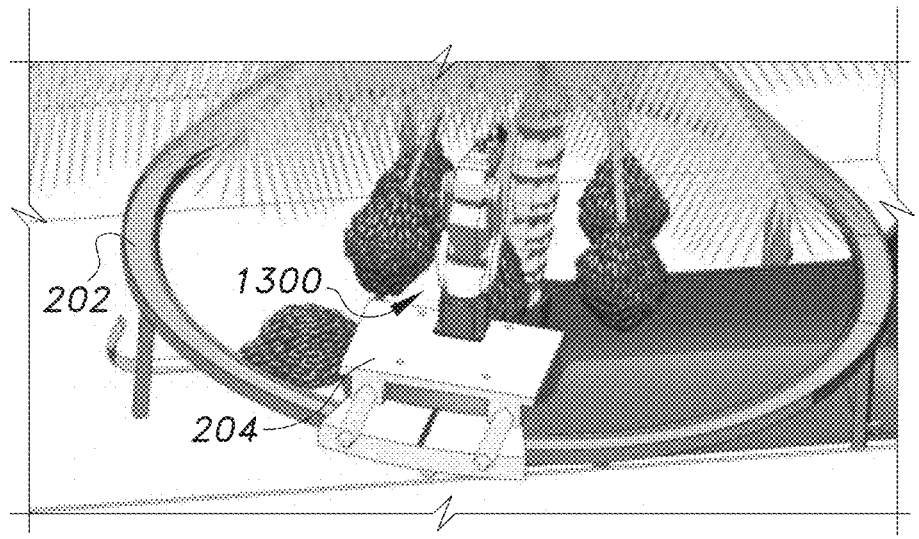

FIG. 21 is a flowchart 2100 of the steps of a harvesting process and FIGS. 22A-22M illustrate the steps of the process. The process starts at step 2102, where the operator drives the robotic system for harvesting and maintaining date palms 100 near a first palm tree PT to be harvested, making sure to align the trunk of the palm tree PT with the center of the system 100. At step 2104, the operator then opens the sections 212, 214 of the circular track 202, as shown in FIG. 22B. At step 2106, the operator drives the system 100 in reverse until the palm tree is in the center of the circular track, as shown in FIG. 22C. At step 2108, the operator closes the sections 212, 214 of the circular track 202, as shown in FIG. 22D, deploys the stabilizers 412, 414, and turns his seat to be facing the palm tree PT, as shown in FIG. 22E. At step 2110, the operator raises the multi-task platform 106 to the top of the palm tree PT, as shown in FIG. 21F.

Figure 22J:
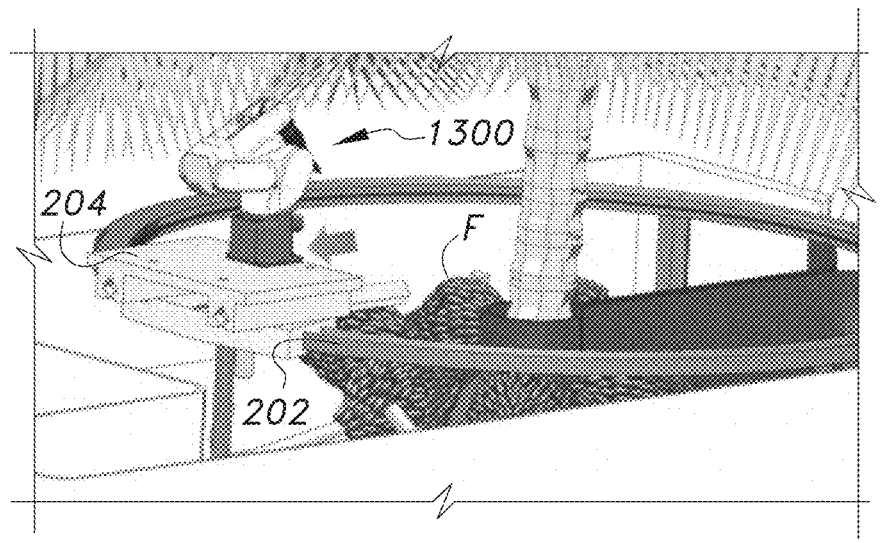
Figure 22K:
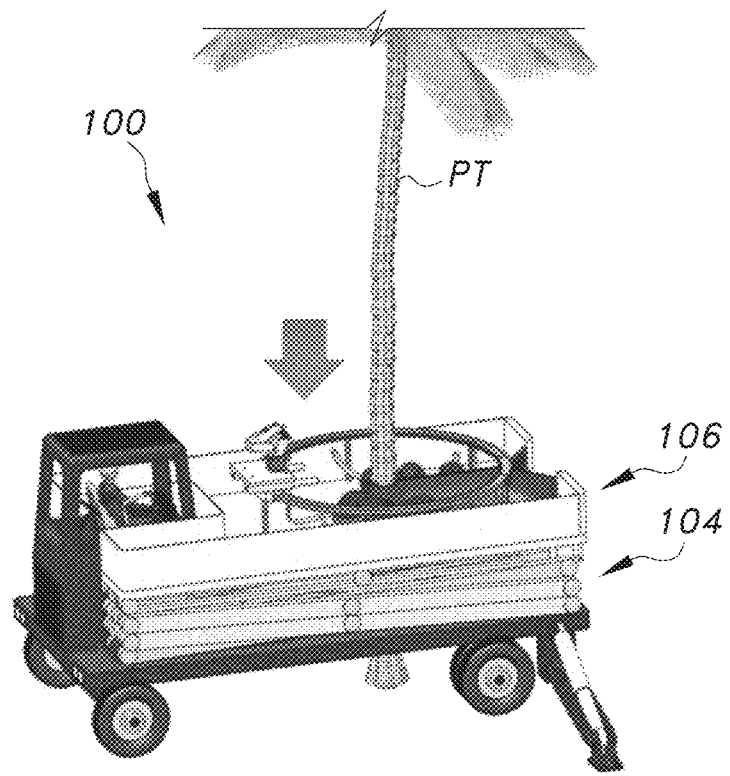
Figure 22L:
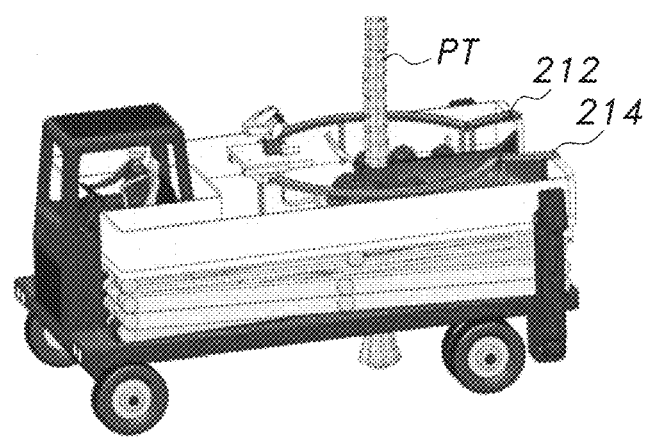
Figure 22M:
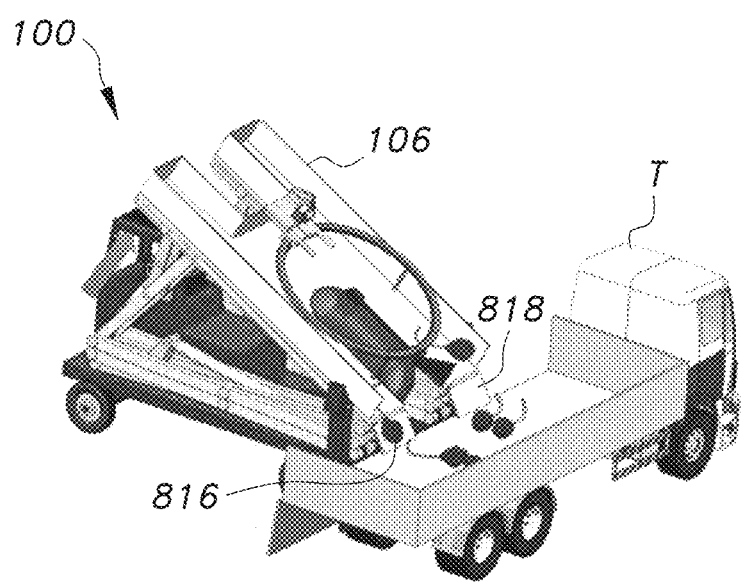

Once the multi-task platform 106 is in position at the correct height for the task to be performed, at step 2112 the operator uses the touch screen 508 to move the 2-DOF slider base 204 about the palm tree PT to perform the required task using either the robotic arm 1300 or the bagging system 1800. In the example shown in FIGS. 22G-22J, the required task is harvesting of unbagged fruit bunches F, using the robotic arm 1300 with the electrical saw 1400 attached to its end effector 1304. The operator controls the 2-DOF slider base 204 using the touch screen 508, while using the hand-operated controller 506 to control the robotic arm 1300 and the electrical saw 1400 until all the fruit bunches have been harvested, as shown in FIG. 22J. At step 2114, the operator uses the touch screen 508 to return the 2-DOF slider base 204 and the robotic arm 1300 to their transporting position and to lower the multi-task platform 106, as shown in FIG. 22K. Also using the touch screen 508, at step 2116, the operator opens the sections 212, 214 of the circular track 202 and retracts the stabilizers 412, 414. The operator also turns his seat to the driving position, as shown in FIG. 22L. At step 2118, the operator determines if the basin 200 is sufficiently full, or if another palm tree can be harvested. If the basin 200 is not full, the process proceeds to step 2102 and the operator drives to the next palm tree to be harvested. If the basin 200 is full, the process proceeds to step 2120 where the operator drives the system 100 to a discharge location, such as a transporting truck T, as shown in FIG. 22M. At this point, once the system 100 is in the correct position, the operator uses the touch screen 508 to open the two rear discharge doors 816, 818 and to incline the multi-task platform 106 using the inclining sub-system 602 to discharge the harvested date fruit bunches into the transporting truck T.

It is to be understood that the robotic system for harvesting and maintaining date palms is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A robotic system for harvesting and maintaining date palms, comprising:
    a truck platform including a flatbed chassis having a front end, a tail end and an upper surface;
    a scissor lift system supported on the upper surface of the flatbed chassis;
    a multi-task platform having a front end and a tail end and supported by the scissor lift system, the multi-task platform including:
        a basin having a bottom, a front end and a tail end;
        a circular track mounted within the basin;
        a slider base mounted on the circular track;
        a tool platform mounted on the slider base, the tool platform having an upper surface;
        means for moving the slider base around the circular track; and
    a palm handling system mounted on the upper surface of the tool platform, the truck platform, the scissor lift system and the multi-task platform having centers of gravity substantially aligned vertically,
    wherein the scissor lift system comprises:
    a lifting sub-system for raising and lowering the multi-task platform; and
    an inclining sub-system for raising and lowering the front end of the multi-task platform relative to the tail end of the multi-task platform;
    wherein:
    the lifting sub-system comprises a left lifting sub-system and a right lifting sub-system; and
    the inclining sub-system comprises a left inclining sub-system and a right inclining sub-system; and
    wherein each of the lifting sub-systems comprises:
    a lower rear linkage having a lower end and an upper end, the lower end of the lower rear linkage being rotatably attached to the upper surface of the flatbed chassis proximate the tail end of the flatbed chassis:
    an upper rear linkage having a lower end and an upper end, the lower end of the upper rear linkage being rotatably mounted to the upper end of the lower rear linkage, the upper end of the upper rear linkage being rotatably attached to the bottom of the basin proximate the tail end of the basin;
    a lower front linkage having a lower end and an upper end, the lower end of the lower front linkage being rotatably and slidably attached to the upper surface of the flatbed chassis proximate the front end of the flatbed chassis; and
    an upper front linkage having a lower end and an upper end, the lower end of the upper front linkage being rotatably mounted to the upper end of the lower front linkage and the upper end of the upper front linkage rotatably supporting one of the inclining sub-systems.

2. The robotic system as recited in claim 1, wherein each of the lifting sub-systems further comprises a lifting cylinder for rotating the upper rear linkage relative to the lower rear linkage to raise and lower the multi-task platform.

3. The robotic system as recited in claim 2, wherein:
    the truck platform further comprises:
        left and right rear scissor lift bearing supports on the upper surface of the flatbed chassis proximate the tail end of the flatbed chassis; and
        left and right front scissor lift sliding bearing housings on the upper surface of the flatbed chassis proximate the front end of the flatbed chassis;
    the basin further comprises:
        left and right rear scissor lift bearing supports mounted on the bottom of the basin proximate the tail end of the basin; and
        left and right front scissor lift sliding bearing housings mounted on the bottom of the basin proximate the front end of the basin; and
    each of the lifting sub-systems further comprises:
        a lower lift rotational bearing extending through one of the rear scissor lift bearing supports and through the lower end of the lower rear linkage;
        a lower sliding bearing extending through one of the front scissor lift sliding bearing housings and through the lower end of the lower front linkage; and
        an upper rear scissor lift bearing extending through one of the rear scissor lift bearing supports and through the upper end of the upper rear linkage.

4. The robotic system as recited in claim 3, wherein each of the inclining sub-systems comprises:

a primary linkage having a lower end, an upper end and a center, the lower end of the primary linkage being rotatably attached to the upper end of the upper front linkage, the upper end of the primary linkage being rotatably and slidably attached to one of the front scissor lift sliding bearing housings; and a secondary linkage having a lower end and an upper end, the lower end of the secondary linkage being rotatably attached to the center of the primary linkage, the upper end of the secondary linkage being rotatably and slidably attached to the one of the front scissor lift sliding bearing housings.

5. The robotic system as recited in claim 4, wherein each of the inclining sub-systems further comprises an inclining cylinder for rotating the secondary linkage relative to the primary linkage to raise and lower the front end of the multi-task platform relative to the tail end of the multi-task platform.

6. The robotic system as recited in claim 5, wherein each of the inclining sub-systems further comprises:
   an upper front scissor lift bearing extending through the upper ends of the upper front linkage and through the lower end of the primary linkage;
   a primary upper bearing extending through the one of the front scissor lift sliding bearing housings and through the upper end of the primary linkage;
   a secondary lower bearing extending through the center of the primary linkage and through the lower end of the secondary linkage; and
   a secondary upper bearing that extending through the one of the front scissor lift sliding bearing housings and through the upper end of the secondary linkage.

7. The robotic system as recited in claim 6, wherein all the linkages are dual-bar linkages.

8. The robotic system as recited in claim 1, wherein the truck platform further comprises a driver/operator cabin mounted on the front end of the flatbed chassis, the driver/operator cabin having:
   a rotatable base; and
   a seat mounted on the rotatable base, the base being rotatable to alternately position the seat in a driving position facing the front of the truck platform and an operator position facing the tail end of the truck platform.

9. The robotic system as recited in claim 8, wherein the driver/operator cabin further comprises a hand-operated controller for controlling components of the palm handling system.

10. The robotic system as recited in claim 9, wherein the driver/operator cabin further comprises an adjustable arm for supporting the hand-operated controller.

11. The robotic system as recited in claim 8, wherein the driver/operator cabin further comprises a touch screen for displaying streaming views from cameras on the multi-task platform, the touch screen being used to control the slider base on the circular track and the scissor lift.

12. The robotic system as recited in claim 1, wherein the basin has a slot defined in the tail end of the basin, the slot having two longitudinal sides extending from the tail end of the basin and a semicircular section connecting the two sides, the basin further comprising an insert filling the slot, the insert having sloping opposite sides and being made of a flexible material, the insert having a circular hole and a slit extending longitudinally from the circular hole to a point near the tail of the basin, where the opposite sides of the insert diverge into two walls forming a flared out section.

13. The robotic system as recited in claim 12, wherein the basin further comprises two rear discharge doors on the tail end of the basin, and hydraulic jacks attached to the two rear discharge doors for opening and closing the doors.

14. The robotic system as recited in claim 1, wherein the palm handling system is a bagging system.

15. The robotic system as recited in claim 14, wherein the bagging system comprises:
   a base;
   a vertical plate attached to and extending upward from the base;
   two rails on the vertical plate;
   a vertically adjustable slider mounted on the two rails;
   a vertical mast having a bottom end and a top end, the bottom end being mounted to the vertically adjustable slider;
   a horizontal pole mounted on the vertical mast proximate the bottom end of the vertical mast, the pole being adapted for supporting a roll of thermoplastic mesh bagging material;
   a cylindrical bag shaper mounted on the vertical mast above the horizontal pole, the cylindrical bag shaper having a frustoconical lower portion for guiding the thermoplastic mesh bagging material around the cylindrical bag shaper and a hole defined therein;
   a circular guide for maintaining the thermoplastic mesh bagging material in close proximity to the cylindrical bag shaper
   two electrically driven bagging material advancing belts for pulling the thermoplastic mesh bagging material upward, and
   a vertical welder having:
      a first heated roller mounted within the cylindrical bag shaper and extending through the hole in the cylindrical bag shaper; and
      a second heated roller mounted on the vertical mast in alignment with the first heated roller to weld two edges of the bagging material together as the material advancing belts pull the thermoplastic mesh bagging material upward.

16. The robotic system as recited in claim 15, wherein the bagging system further comprises a pair of cutting blades rotatably attached to the vertical mast above the cylindrical bag shaper.

17. The robotic system as recited in claim 15, wherein the bagging system further comprises a pair of electric thermal gluing fingers rotatably attached to the vertical mast above the pair of cutting blades.

\* \* \* \* \*